US012739667B2

(12) United States Patent
Khalid et al.

(10) Patent No.: US 12,739,667 B2
(45) Date of Patent: Sep. 15, 2026

(54) METHODS AND APPARATUS FOR AUTOMATIC UN-MANAGEMENT AND AUTOMATIC MANAGEMENT OF CELLS IN A HYBRID MOBILE NETWORK OPERATOR (HMNO) NETWORK

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 173 days.

(21) Appl. No.: 18/736,443

(22) Filed: Jun. 6, 2024

(65) Prior Publication Data

US 2025/0380156 A1 Dec. 11, 2025

(51) Int. Cl.

*H04W 16/18* (2009.01)
*H04L 41/5009* (2022.01)
*H04W 24/02* (2009.01)

(52) U.S. Cl.

CPC ......... *H04W 24/02* (2013.01); *H04L 41/5009* (2013.01)

(58) Field of Classification Search

CPC .... H04W 24/02; H04W 24/04; H04L 41/5009
USPC .......................................................... 455/446
See application file for complete search history.

(56) References Cited

U.S. PATENT DOCUMENTS

2002/0142766 A1* 10/2002 Iyer ........................ H04W 24/02 455/423
2020/0304364 A1* 9/2020 Tapia ........................ G06N 7/01
2020/0367234 A1* 11/2020 Bergström ............ H04L 5/0082

* cited by examiner

*Primary Examiner* — Tanmay K Shah
(74) *Attorney, Agent, or Firm* — Straub & Straub; Michael P. Straub; Stephen T. Straub

(57) ABSTRACT

An automatic management entity is included in a Hybrid Mobile Network Operator's system. The automatic management entity operates in conjunction with an Operations Support System (OSS) to automatically identify cells within the HMNO's own mobile wireless network to be removed from service due to poor performance, low throughput, or for other reasons, and initiates the un-management process. By automating the process timely identification of cells to be removed from service and removal of cells from service can be implemented quickly without human involvement. The automatic management entity takes into consideration the availability of alternative wireless coverage and impact to quality of service to the HMNO subscriber, e.g., user experience, when making a decision as to whether or not to take a cell with poor performance out of service. The automatic management entity prioritizes the desired repair order and communicates service priority information to the OSS along with the unmanage list.

20 Claims, 13 Drawing Sheets

| FIGURE 6A |
| --- |
| FIGURE 6B |

FIGURE 6

| FIGURE 7A |
| --- |
| FIGURE 7B |

METHODS AND APPARATUS FOR AUTOMATIC UN-MANAGEMENT AND AUTOMATIC MANAGEMENT OF CELLS IN A HYBRID MOBILE NETWORK OPERATOR (HMNO) NETWORK

FIELD

The present application relates to wireless networks and more particularly to methods and apparatus for automatically taking cells out of service and automatically placing cells back into service, e.g., in response to service issues that can be due to a variety of causes.

BACKGROUND

A Hybrid Mobile Network Operator (HMNO) operates a first wireless network using its own first set of base stations, e.g., a large set of small cell base stations. The HMNO operator supplements its coverage via use of a mobile virtual network operator (MVNO) network, which uses physical resources, e.g. large cell base stations of a partner mobile network operator (MNO). The partner MNO normally charges for service provided to the HMNO's customers. Thus, for cost reasons, from the perspective of the HMNO operator, it is desirable to keep as much traffic as possible, corresponding to its own customers, on its own HMNO wireless network infrastructure. While utilizing the HMNO's own network as much as possible has cost benefits, if the HMNO's own network provides poor or unreliable service in an area, it may be preferrable to have the HMNO's customers use the MVNO network instead, to avoid the HMNO's customers becoming unsatisfied with the service they are obtaining by subscribing to wireless service with the HMNO.

A HMNO's own network often is made up of a large number of small cells, e.g., hundreds or even thousands of small cells. While small cells are generally reliable, they can still suffer from hardware failures, configuration problems and/or automatically triggered reboots which can occur on a recurring basis due to a variety of hardware and/or software issues. In addition, for a variety of reasons, a customer attached to a small cell may be connected from a control plane perspective but may be unable to obtain data services via the data plane provided by a particular small cell. This may be, and sometime is, due to a problem with a user plane function (UPF). Even in cases where users are successfully attached to a small cell, the users may be receiving unsatisfactory data services, e.g., in terms of the data rate that can be supported due to cell configuration and/or other issues.

Cells which are not operating properly are often taken out of service manually. The process of removing a cell from service is sometimes referred to as unmanaging a cell. The decision to take a cell out of service is normally made by a human operator, who then manually triggers the unmanaging process by taking steps to remove the cell from service. Adding or restoring a cell to service is sometimes referred to as managing a cell because by putting the cell into service it starts being managed by the network operator.

The decision to take a cell out of service and put it back into service manually can take time, during which customers may receive poor or no service at all due to problems with a cell. In the case of a network made up of large cells, the number of cells to be managed is relatively small, and the large number of customers being serviced by individual cells can justify human involvement in the decision making process as to whether a cell should be unmanaged and subsequent involvement in the process of removing the cell from service when a decision is made to unmanage a cell.

In the case of a small cell operator handling hundreds or even thousands of cells, it can be difficult to make decisions in a timely manner, as to which cells to unmanage at any given time, to protect the quality of the customer experience. In addition, the time to manually unmanage cells and place the cells back into service, e.g., after repairs can be timely and difficult to keep up with when there is a very large number of small cells in a system.

From the perspective of a HMNO operator, it would be desirable if methods and/or apparatus could be developed which reduce or limit the need for human involvement in the process of identifying cells which should be unmanaged at a given time, unmanaging the cells, and/or restoring the cells to service after repairs or replacement.

SUMMARY

In various embodiments, an automatic management entity is included in a Hybrid Mobile Network Operator's system. The automatic management entity operates in conjunction with an Operations Support System (OSS) to automatically identify cells within the HMNO's own mobile wireless network which are to be removed from service, e.g., unmanaged, and initiates the un-management process. The automatic management entity subscribes to the OSS to receive cell information on an ongoing basis. The information to which the automatic management entity subscribes include, e.g., events, alarms, and/or key performance indicators (KPIs) corresponding to the cells of its mobile wireless network. The automatic management entity evaluates the performance of the HMNO's operators cells to identify problem cells, e.g., cells with reboot issues and poor performing cells, based on the received cell information from the OSS and cell removal criteria. In some embodiments, the automatic management entity determines and uses different cell removal criteria for different one of its managed cells, e.g., based on the location of the cell with respect to other cells in the network and the expected type of activity in the cell, e.g., fast moving UEs or relatively stationary UEs which remain in the cell for a long time. The automatic management entity, which has access to the coverage maps of its own mobile wireless network and a MVNO network using partner network resources, takes into consideration the availability of alternative wireless coverage and impact to quality of service to the HMNO subscriber, e.g., user experience, when making a decision as to whether or not to take a cell with poor performance out of service. The automatic management entity generates and sends a list of cells to be unmanaged (removed from service) to the OSS. In some embodiments, when the automatic management entity decides that multiple cells should be removed from service, the automatic management entity prioritizes the desired repair order and communicates service priority information to the OSS along with the unmanage list.

An exemplary method of operating an automatic network management entity in accordance with some embodiments comprises: subscribing to an operations support system (OSS) to receive cell information; receiving cell related performance information relating to one or more cells, said cell related performance information including information relating to at least a first cell; analyzing the received cell related performance information to determine if one or more cells are to removed from service; and in response to determining that one or more cells is to be removed from service, automatically sending a message to initiate removal from service of the one or more cells, said message including a cell list listing cells to be removed from service, said cell list including at least the first cell.

While various features are discussed in the above summary, all features discussed above need not be supported in all embodiments and numerous variations are possible. Additional features, details and embodiments are discussed in the detailed description which follows.

BRIEF DESCRIPTION OF THE FIGURES

FIG. 6 comprises the combination of FIG. 6A and FIG. 6B.

DETAILED DESCRIPTION

Figure 1:
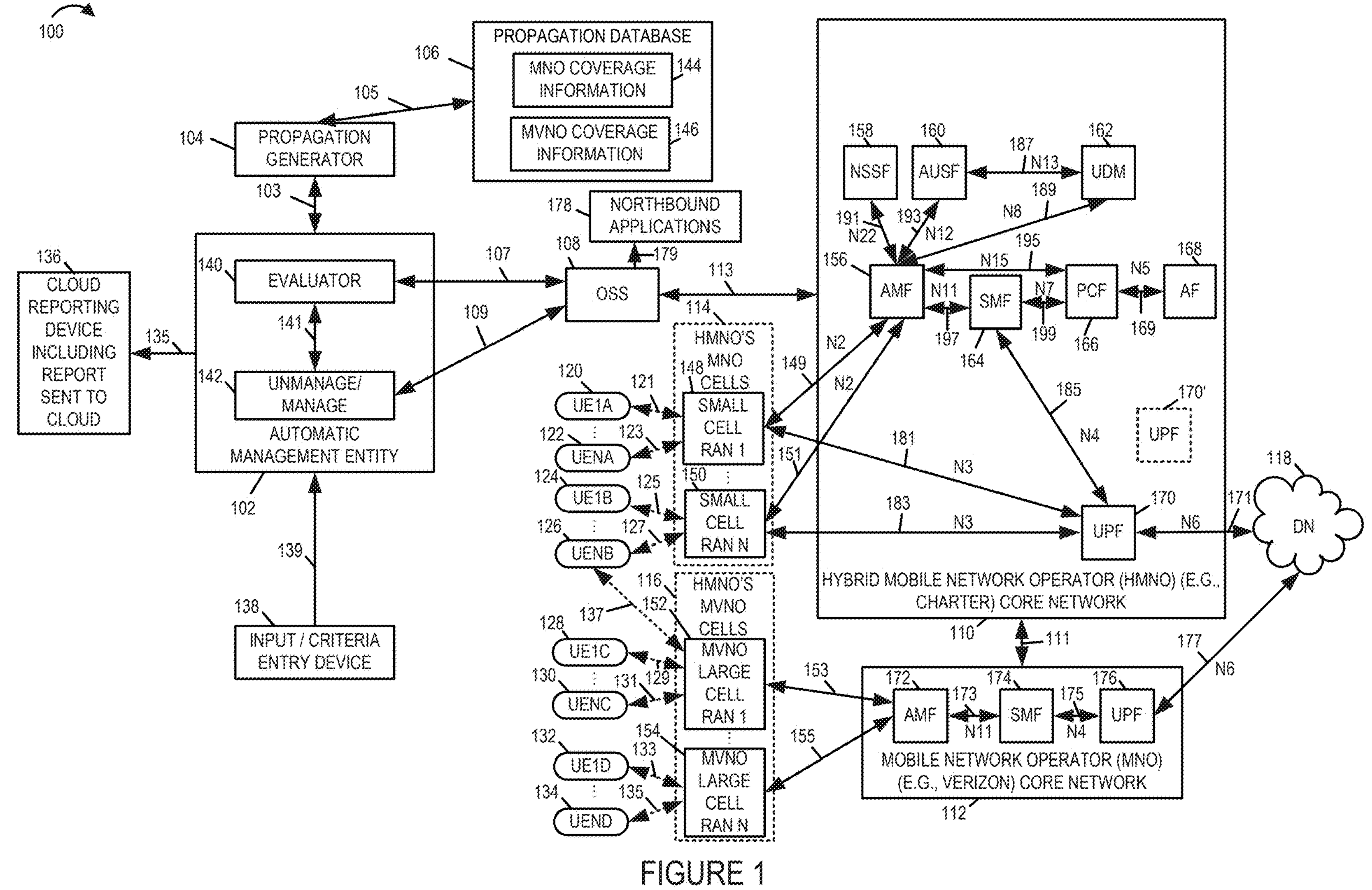
FIG. 1 is a drawing of an exemplary communications system implemented in accordance with one embodiment of the invention.

FIG. 1 illustrates an exemplary system 100 in which the invention is implemented in one exemplary embodiment. The system includes a first wireless network, e.g., a first Mobile Network Operator (MNO) network, owned and operated by a first network operator implementing the present invention. In some embodiments, the first MNO network includes a large number of small cells, e.g. a large number of CBRS femto cell base stations. The first network operator, in some embodiments, is a Hybrid Mobile Network Operator (HMNO). In such an embodiment the first network operator, in addition to operating the first wireless network, e.g., the first MNO network, also operates a second wireless network, e.g., a Mobile Virtual Network Operator (MVNO) network, making the first network operator a Mobile Virtual Network Operator (MVNO). The MVNO network is implemented using the physical resources of a second mobile network operator (MNO), e.g., network resources of a partner MNO such as Verizon. In various embodiments the first wireless network (e.g., first MNO network) includes a large number of small cells, e.g., hundreds or even thousands of small cells. The second MNO normally operates macro cells, with large coverage areas, with the coverage areas of the second MNO network overlapping and/or supplementing the coverage areas of the first MNO network. The first network operator, who is an HMNO operator in this example, normally has to pay for use of the second MNO's network and data transferred on using such resources. Accordingly, the first network operator normally prefers that first network operator service subscribers use the first MNO cells for data transfer when possible. However, in order to provide a quality service to its customers the first network operator may have its users (subscribers) use the resources of the partner MNO (second MNO) network, which are available to the MVNO in cases where the first network operator's own MNO network (first MNO network) can not provide service or the quality of the service would be unsatisfactory for some reason. Each cell normally includes a base station, and thus a cell corresponds to a base station used to provide the radio coverage of a cell. Failure of a base station corresponding to a cell, recurring reboots of a base station corresponding to a cell, software or other configuration issues at a base station, hardware issues at a base station and/or failure of base station data plane connectivity to a UE while maintaining control plane connectivity to a UE are all conditions which can interfere with a UE's operation and thus the service subscribers quality of service. Any or all of such base station issues which can create a poor user experience at a cell may justify the first network operator taking a cell out of service, and allowing a user to obtain service via the MVNO and second network operator resources, in order to protect the quality of service experienced by a subscriber, who subscribes to service provided by the first network operator, which is a HMNO. When the first network operator takes one of its first MNO cells out of service, this tends to increase the charges to the first network operator by the partner network operator, since use of the partner's network by first network operator service subscribers will increase. Accordingly, decisions to take small cells of the first MNO network out of service and move the traffic onto the partner network via virtual mobile network operation can be costly but are important to maintain customer satisfaction levels.

Given the large number of cells in the first MNO network, having a human involved in deciding which cells to unmanage, e.g., take out of service, and having a human involved in implementing the steps to unmanage a cell to be taken out of service can be costly and may involve delays relating to un-management decision making and implementation. During the time period in which an un-management decision is made, UEs of HMNO subscribers may continue to interact with and/or connect to faulty cells or cells which are providing unsatisfactory levels of service.

In order to expediate the identification of cells to be un-managed and to automate the un-management process, in accordance with the invention an automatic management entity device 102 is included in the first network operator's system. The automatic management entity device 102 identifies cells, e.g., small cells of the first MNO, to be unmanaged and then automatically triggers the automatic unmanagement of the cell or cells to be unmanaged. The automatic management entity device 102 then prioritizes the unmanaged cells for repair or replacement and is responsible for automatically managing, e.g., re-instating or adding, cells that have been repaired or replaced, e.g., by upgrading, repairing, reconfiguring or replacing a base station which was providing unsatisfactory service.

By automating the process of identifying cells/base stations providing bad service and unmanaging them, a HMNO's subscribers can be provided with a higher quality of service than might be provided if human involvement was required with each cell un-management and management decision and/or operation.

FIG. 1 is a drawing of an exemplary communications system 100 in accordance with an exemplary embodiment. Exemplary communications system 100 includes an automatic management entity 102, a propagation generator 104, a propagation database 106, an operations support system (OSS) 108, a hybrid mobile network operator (HMNO), e.g., Charter, core network 110, a mobile network operator (MNO), e.g., Verizon, core network, a plurality of small cell radio access networks (RANs) 114, e.g., a plurality of small cell gNB base stations which are part of the first MNO, a plurality of large cell RANs 116, e.g., a plurality of large cell gNB base stations which are physically part of the second MNO but are used as part of the MVNO, a data network (DN) 118, a cloud reporting device 136 which receives, processes and stores reports from the automatic management entity 102, an input/criteria entry device 138, northbound applications 178, and a plurality of user equipments (UEs), e.g., user wireless communications devices such as cellphones, wireless laptops, etc., coupled together as shown.

The automatic management entity 102 includes an evaluator 140 and an unmanage/manage component 142 coupled together via communications link 141. The propagation database 106 includes MNO coverage information 144, corresponding to a first MNO, e.g., Charter, wireless network, and MNVO coverage information, corresponding to a MVNO network, which uses physical resources, e.g., large cell base stations, of second MNO, e.g., Verizon.

HMNO core network 110, e.g., a Charter core network, includes a plurality of entities and/or functions including an access and mobility management function (AMF) 156, a session management function (SMF) 164, a policy control function (PCF) 166, an application function (AF) 168, a network slice selection function (NSSF) 158, an authentication server function (AUSF) 160, a unified data management (UDM) 162, and a user plane function (UPF) 170 coupled together as shown. Although only one instance of each function is shown for most of the exemplary functions in the core 110 for simplicity of illustration, typically there are multiple instances of at least some of the functions in the core network 110, e.g., multiple UPFs (UPF 170, UPF 170'), e.g., with different UPFs being used by some different small cell RANs, and different ones of the UPFs may fail at different times, e.g. with failure of a single UPF in the core 110 affecting some of the small cell base stations with regard to the communication of data but not affecting others.

MNO core network 112, e.g., the Verizon core network, includes a plurality of entities/functions and connections, similar to those of the HMNO, e.g., Charter, core network 110; however, only a few of the implemented functions and connections are illustrated in FIG. 1 to simplify the illustration. MNO core network 112 includes an access and mobility management function (AMF) 172, a session management function (SMF) 174 and a user plane function (UPF) 176 coupled together as shown.

The plurality of small cell RANs 114 (small cell RAN 1 148, . . . , small cell RAN N) are, e.g., small cell gNB base stations which are part of a first MNO wireless network which is part of the HMNO network. The OSS 108 and the automatic management entity 102, work together with the HMNO core network to control, monitor, and support the operation of the first MNO, e.g., the Charter MNO, which includes the plurality of small cell base stations (small cell RAN 1 148, . . . , small cell RAN N 150). Based on evaluation of the evaluator 140 of the automatic management entity 120, e.g., using input/criteria from entry device 138 and network status/performance information from OSS 108, the unmanage/manage entity 142 of the automatic management entity 102 may, and sometime does, perform operations to remove one or more small cell base stations from the set 114 of first MNO small cell base stations from service, e.g., due to detected failures, events, problems, unacceptable levels of service, e.g., for repair and/or maintenance, and/or to restore or replace one or more of the small cell base station of the set 114 of first MNO small cell base stations to a managed station, e.g. following repair or replacement of the small cell base station which was placed in an unmanaged state of operation.

The plurality of large cell RANs 116 (large cell RAN 1 152, . . . , large cell RAN N 153) are, e.g., large cell gNB base stations, which are part of a MVNO network using the physical resources of second MNO, e.g. a Verizon MNO. Typically, the MVNO cells 116 are used, e.g. as a backup network, to supplement and provide coverage to HMNO subscriber UEs in areas in which the first MNO network MNO small cell base stations 114 are not providing coverage or are not capable of providing an adequate quality of service.

In some exemplary embodiments, the first MNO small cell base stations of set of first MNO cells 114 of the first MNO, e.g., Charter, operate using a first frequency band, and the set 116 of MVNO large cell base station using the physical resources of the second MNO, e.g., Verizon, use a second frequency band. In some such embodiments, the first frequency band is higher than the second frequency band.

The communications system 100 further includes a plurality of user equipments (UEs) (UE1A 120, . . . , UENA 122, U1B 124, . . . , UENB 126, UE1C 128, . . . , UENC 130, UE1D 132, . . . , UEND 134), which are subscriber devices of the HMNO, e.g., Charter subscriber wireless devices. At least some of the UEs are mobile devices, which may move throughout the communications system and be connected to different base stations at different times.

Automatic management entity evaluates, unmanages and manages cells, e.g., small cell base stations (small cell RAN 1 148, . . . , small cell RAN N 150) of the first MNO using information from the OSS 108, information from the propagation generator 104, and input/criteria received from input/criteria entry device 138.

Automatic management entity 102 is coupled to the propagation generator 104 via communications link 103. Propagation generator 104 is coupled to propagation database 106 via communications link 105. Automatic management entity 102 is coupled to input/entry device 138 via communications link 139. OSS 107 is coupled to evaluator 140 of the automatic management entity 102 via communications link 107. OSS 108 is coupled to unmanage/manage component 142 of the automatic management entity 102 via communications link 109. Automatic management entity 102 is coupled to cloud reporting device 136 via communications link 135.

OSS 108 is coupled to HMNO core network 110 via communications link 113. Small cell RAN 1 148, e.g., a gNB small cell base station, is coupled to AMF 156 via N2 interface connection 149. Small cell RAN N 148, e.g., a gNB small cell base station, is coupled to AMF 156 via N2 interface connection 151. Small cell RAN 1 148, e.g., a gNB small cell base station, is coupled to UPF 170 via N3 interface connection 181. Small cell RAN N 148, e.g., a gNB small cell base station, is coupled to UPF 170 via N3 interface connection 183.

UEs (UE1A 120, . . . , UENA 122) are shown coupled to small cell RAN 1 148 via wireless communications links (121, . . . , 123), respectively. UEs (UE1B 124, . . . , UENB 126) are coupled to small cell RAN N 150 via wireless communications links (125, . . . , 127), respectively. Exemplary UENB 126 is shown connected to both small cell RAN N 150, e.g., a small cell gNB base station of the first MNO, and large cell RAN 1 152, e.g., a large cell gNB base station of the second MNO.

AMF 156 is coupled to functions (SMF 164, PCF 166, NSSF 158, AUSF 160, UDM 162), via interface connections (N11 197, N15 195, N22 158, N12 193, N2 189), respectively. AUSF 160 is coupled to UDM 162 via N13 interface connection 187. SMF 164 is coupled to PCF 166 vis N7 interface connection 199. SMF 164 is coupled to UPF 170 via N4 interface connection 185. PCF 166 is coupled to AF 168 via N5 interface connection 169. UPF 170 is coupled to DN 118 via N6 connection 171.

UEs (UE1C 128, . . . , UENC 130) are shown coupled to large cell RAN 1 152 via wireless communications links (129, . . . , 131), respectively. UEs (UE1D 132, . . . , UEND 134) are coupled to large cell RAN N 154 via wireless communications links (133, . . . , 135), respectively. UENB 126 is coupled to large cell RAN 1 152 via wireless communications link 137.

Large cell RAN 1 152, e.g., a large cell gNB base station, is coupled to AMF 172 of MNO core network 112 via N2 interface connection 153. Large cell RAN N 154, e.g., a large cell gNB base station, is coupled to AMF 172 of MNO core network 112 via N2 interface connection 155. AMF 172 is coupled to SMF 174 via N11 interface connection 173. SMF 174 is coupled to UPF 176 via N4 interface connection 175. UPF 176 is coupled to DN 118 via N6 interface connection 177.

UEs (120, 122, 124, 126, 128, 130, 132, 134), which are subscriber devices of the HMNO, can be coupled to either or both of: i) a small cell base station of the first MNO or ii) a large cell base station of the MVNO, using the physical resources of the second MNO. However, it is desirable, from the perspective of the HMNO, for its subscriber UEs to use the first MNO small cell base stations 114 for communications, whenever it is possible to provide an adequate level of service, instead of using the MVNO large cell base station 116, due to usage charges to use the physical resources of the second MNO.

The Hybrid Mobile Network Operator (HMNO), e.g., Charter, network of FIG. 1 includes a first MNO, e.g., Charter, network which includes first MNO small cell base stations 114, and a MVNO network including MVNO large cell, e.g., macro cell, base stations 116, which are physical resources of a second MNO, e.g. Verizon.

Mobile subscribers, e.g., HMNO UE subscribers, are transitioned between the two networks, e.g., the first MNO network and the MVNO network, via an application on the mobile UEs, e.g., mobile phones. This application is called the connection manager. Connection manager is able to transition the phones between the two networks based on coverage. However, the connection manager doesn't typically transition the UEs based on performance of the alternative radio networks.

The first MNO network, which includes first MNO small cells 114, includes a larger number of cells with small individual footprints. In the past, maintenance of these cells has been traditionally done in batches, i.e., when a certain number of cells are not online, are performing poorly and/or require troubleshooting and/or maintenance. This approach usually results in some cells going out of service or performing poorly for a while before they are detected and removed, e.g., un-managed, from the system or before the issue is fixed. In accordance with a feature of the present invention, the automatic management entity 102 finds under-performing and poorly performing cells and un-manages them. In addition, before the automatic management entity 102 performs unmanaging of a detected under-performing or poorly performing cell, the automatic management entity 102 ensures that various previously defined criteria is satisfied.

Unmanaging of a cell, results in the cell going out of service as far as serving the UE customers are concerned, i.e., the radio (base station wireless transmitter) of the cell doesn't transmit and UEs can no longer connect to that cell.

The un-management of cells has been previously done manually, with human operator involvement. It is very time consuming and thus expensive to detect these problem cells using the manual approach. In addition, the manual approach is prone to human error due to the manual work. An exemplary method, in accordance with the present invention, implements and uses an automatic management entity 102, to remove manual aspects and thus provide for a more efficient, faster, and higher accuracy approach to detecting problematic cells and performing cell unmanagement.

In addition to unmanaging cell, the automatic management entity 102, in accordance with another feature of the present invention, will also ensure that it will update the OSS 108 for accurate stats reporting to 3rd party applications, e.g., via updates data sent on northbound interfaces to northbound applications 178. The automatic management entity 102 also generates and sends a report, e.g. to cloud reporting device 136, to allow the administrator to understand the results. The generations and sending of update data to 3rd party applications and a report to cloud reporting device 136 for an administrator are performed by the automatic management entity 102 to ensure that correct statistics (stats) are reported and the data is not biased. The updates and report make the 3rd party applications and administrator aware that particular cell(s) are now unmanaged, and thus will not have any user data traffic or support user traffic data, and take that into consideration, e.g., for network analysis and/or operations, e.g., with regard to the first MNO. Thus, the number of managed cells in the first MNO and the set of managed cells in the first MNO is adjusted, e.g. reduced, based on the updates/report which identify the cells being transitioned from managed to unmanaged cells.

In a wireless network including a large number of cells, such as the first MNO wireless network including a large number or small cells 114, some cells may, and sometimes do, have issues and can go into a state of having a constant issue, e.g., a constant problem. Exemplary constant issues include: i) cyclic reboots due to: GPS issues, hardware issues, or other software issues such as able modem related issues, memory overload issues, etc., ii) poor radio performed due to radio issues or due to backhaul issues, iii) other issues such as poor Key Performance Indicators (KPIs), e.g., poor retention, poor call success rate, etc., and iv) Spectrum Access System (SAS) related issues, e.g., SAS not giving the cell base station enough spectrum to satisfy the QoS requirements of the UEs being serviced by the base station.

If these poorly operating cells go undetected within the network, this can, and sometimes does, result in poor experience for the end user, e.g., the subscriber to the HMNO. For example, the subscriber's UE may lose service abruptly due to a reboot or have poor service due to drops or poor throughput, etc. In accordance with the feature of the present invention, the automatic management entity 102 will look at alarms and events generated by the OSS 208. The events and alarms from the OSS 108 will be conveyed by messages, which are generated and sent by the OSS 108 in response to detected issues, e.g., detected cell resets, etc. In this way, the automatic management entity 102 can detect cells with issues, e.g., cells that are having rebooting issues. The automatic management entity 102 will, e.g., as part of an initialization process, subscribe to the OSS 108 for events and alarms. Note that not all resets trigger alarms, which are generally used for network monitoring.

Another case, in which the automatic management entity 102 may decide to unmanage a particular cell, e.g., unmanage one of the small cell base stations in the first MNO network cells 114, would be if the connectivity to other core network components is lost, e.g., the particular UPF, e.g., UPF 170 or UPF 170', being used by the small cell base station, is out of service. In such a case, the UE will get attached to the network but there will be no service, i.e., no data service for the UE.

In addition, the automatic management entity 102 will also subscribe to selected KPIs/counters and if a selected KPI/counter along with connected users drops to or below a pre-defined threshold, the automatic management entity will activate and take action as directed, e.g. unmanage the particular cell to which the KPI/counter fell to or below the pre-defined threshold.

The exemplary HMNO system includes two wireless networks, e.g., the first MNO wireless network, owned and operated by the HMNO, and MVNO wireless network using physical resources of a partner MNO, the MVNO can be, and sometimes is used as a backup wireless network to backup the first MNO network.

The automatic management entity 102 including the evaluator 140 and the unmanage/manage entity 142 is a key element of the present invention and subscribes to services from various systems, e.g., the OSS 108, which monitors for events and alerts, and collects first MNO network statistical information, and a propagation information system including the propagation generator 104 and propagation database 106, which provides coverage and propagation information for cells of the first MNO and the MVNO.

The evaluator 140 part of the automatic management entity 102 has a subscription and fetches information such as event, counters, etc., from the OSS 108, and then performs evaluations, e.g. calculations, based on the criteria received, e.g., previously received as part on an initialization or set-up procedure, from the input/criteria entry device 138, said criteria having been given, e.g., input, by a user, e.g., a system administrator. Exemplary criteria used in evaluation of unacceptable cell operation/level of service includes: i) a predetermined number of resets within a predetermined time interval, e.g. 5 resets withing a period of 24 hours; ii) a cumulative throughput below a threshold, e.g. 5 Mbps with 20 UEs on the cell.; and iii) a particular event detected, e.g., event detected: UPF down, in which case a UE will latch to the network at the cell but will not have service.

In each of the above-mentioned cases in which cell operation/performance is evaluated (for a small cell base station of the first MNO), by evaluator 140, resulting in unacceptable operation/performance, it is desired to either move the UE, using the cell, to an alternative network or turn-off the site(s) that are causing poor performance in the area so that the customer does not experience poor performance.

The automation management entity 102 also subscribes to a propagation generator 104 to ensure that it has the information to evaluate the criteria, i.e., to ensure that the UE will have back up coverage from the MVNO and whether the removal of the cell (small cell base station with unacceptable operation/performance) will result in a worse user experience for the UE or a better user experience for the UE.

Turning off a cell, e.g., a small cell base station in the first MNO, is performed, e.g., automatically, under the control of the unmanage/manage entity 142, once a cell has been identified as meeting a certain criteria. This criteria, used for evaluation, will be provided to the automatic management entity 102 prior to the time of evaluation and stored in the automatic management entity 102, e.g., during an initialization or set-up interval, so that the automatic management entity 102 can automatically detect underperforming cells and cells with issues, to isolate those cells from the system. In addition to the above-mentioned criteria, there are other factors that play an important role in the exemplary method, e.g., factors used in prioritizing the cells which need repair, i.e., identified problem cells within a cluster of a straight line should be prioritized for a fix before other identified problem cells are fixed.

Figure 2:
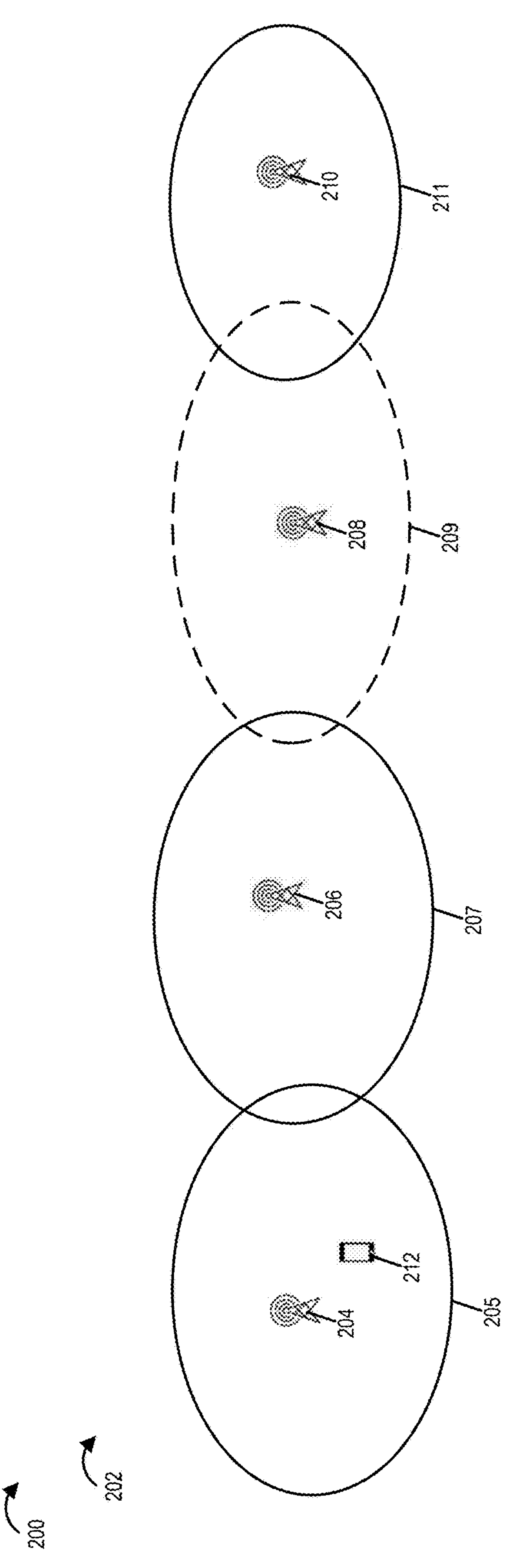
FIG. 2 illustrates an exemplary cell deployment case scenario in which UEs will be expected to be transitioning rather quickly through an identified problem cell, with poor performance or with a rebooting issue, said problem cell being within a group of cells along a transit path, and a decision is made by an automatic management entity to keep the radio of the problem cell base station active.
Figure 2:
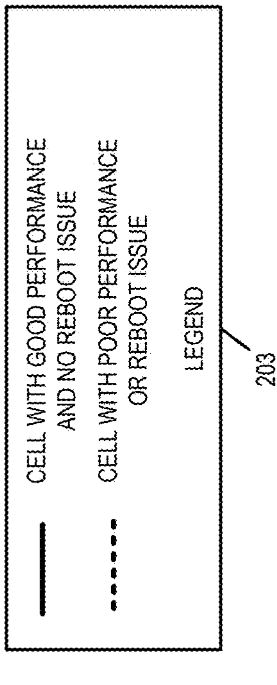
Figure 3:
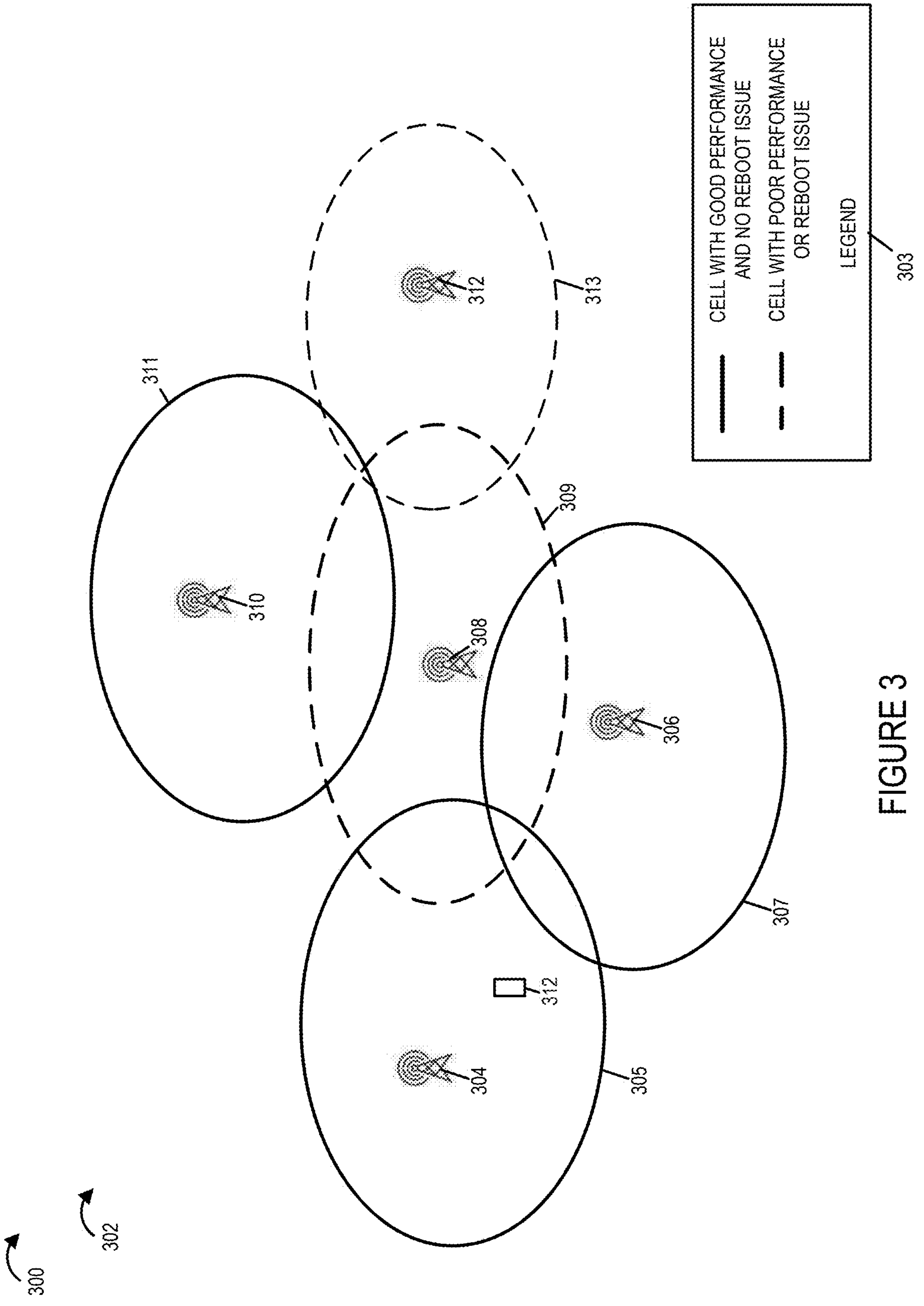
FIG. 3 illustrates an exemplary cell deployment case scenario in which slow moving UEs will be expected to stay within an area, e.g., a park or venue, in which a cluster of cells in a mobile wireless network provide coverage and several of the cells are experiencing performance issues, and a decision is made by an automatic management entity to turn-off the poor performing cells.
Figure 4:
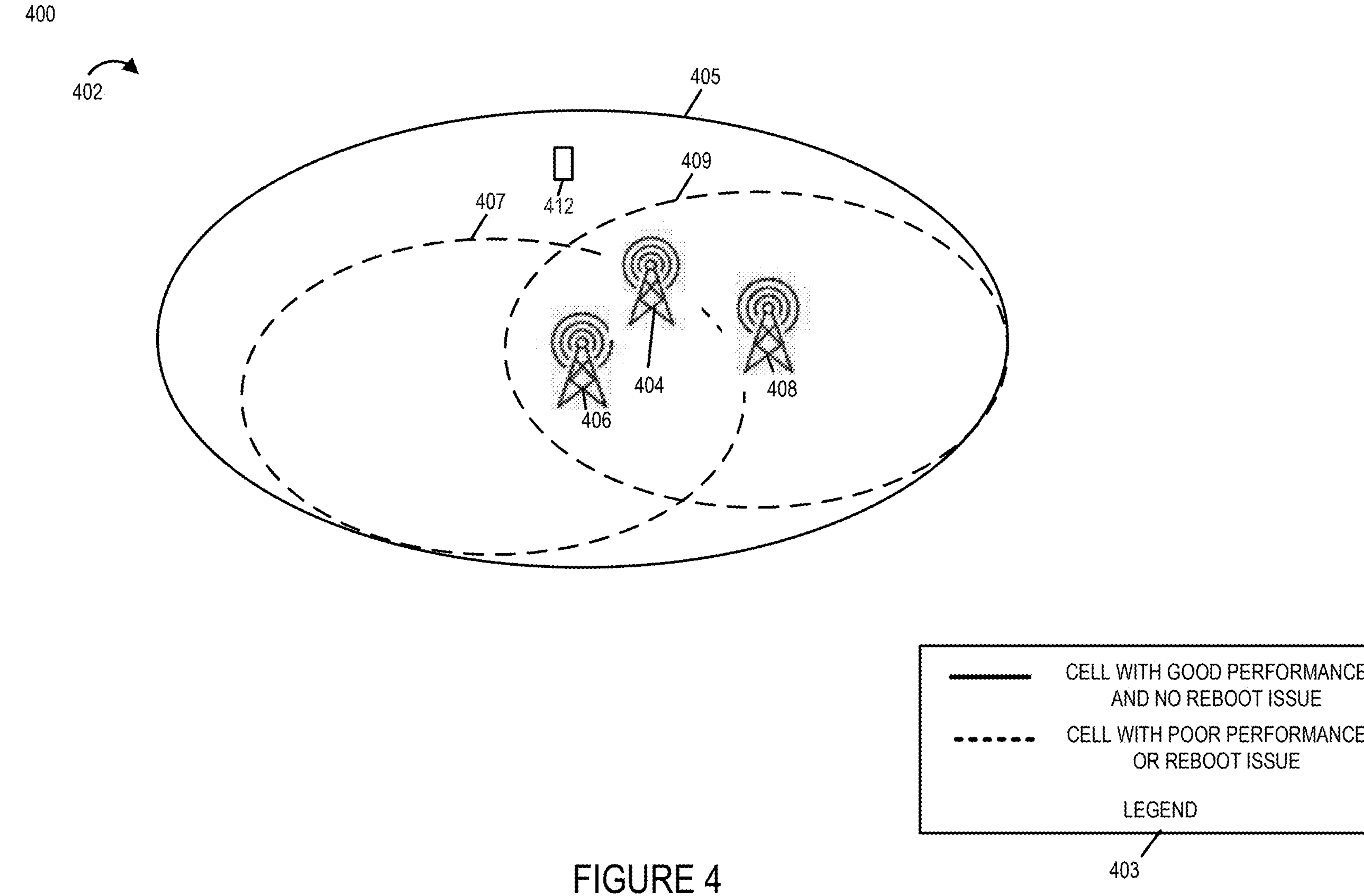
FIG. 4 illustrates an exemplary cell deployment case scenario in which the wireless coverage areas of two cells with performance issues is contained within the wireless coverage area of a third cell, which has acceptable performances and a decision is made the an automatic management entity to turn-off the underlying cells with poor performance.

FIG. 2-4 illustrate exemplary deployment cases in accordance with an exemplary embodiment. FIG. 2 is a drawing 200 including drawing 202 illustrating an exemplary first deployment case and a corresponding legend 203. In drawing 202 a plurality of small cells (e.g., within MNO cells 114) in the first MNO wireless network of FIG. 1, which are under the control of automatic management entity 202, are deployed in a relatively straight line, and exemplary UEs including UE 214 are expected to transition relatively quickly through the straight line of cells, e.g., the cells are located along a roadway, e.g. highway, and the UEs transitioning through are expected to be mostly included in or part of a vehicle in motion. Legend 203 indicates that a cell with good performance and with no reboot issue is represented by a solid line, while a cell with poor performance or a reboot issue is represented by a dashed line.

In drawing 202, small cell base station 204, which has a corresponding cellular coverage area 205, is a cell with good performance and does not have a reboot issue; small cell base station 206, which has a corresponding cellular coverage area 207, is a cell with good performance and does not have a reboot issue; small cell base station 208, which has a corresponding cellular coverage area 209 is a cell with poor performance or a cell which has a reboot issue; and small cell base station 210, which has a corresponding cellular coverage area 211 is a cell with good performance and does not have a reboot issue. UE's, e.g., exemplary UE 212, will be transitioning, e.g., in a vehicle, through the problem cell (cellular coverage area 209 corresponding to small cell base station 208), which is a cell with poor performance, e.g., an underperforming cell with respect to criteria, or a cell with a rebooting issue with respect to criteria. The problem cell is an inner cell within the string of cells rather than an end point cell along the line of cells. In this case, it makes sense to keep the radio in small cell base station 208 on as the UE 212 will transition quickly through the problem cell, as it may be advantageous to remain on the first MNO wireless network, rather than switching to the MNVO network and then having to switch back to the first MNO network.

FIG. 3 is a drawing 300 including drawing 302 illustrating an exemplary second deployment case and a corresponding legend 303. In drawing 302 a plurality of small cells (e.g., within MNO cells 114) in the first MNO wireless network of FIG. 1, which are under the control of automatic management entity 202, are deployed in a cluster, and exemplary UEs including UE 314 are expected to be relatively slow moving UEs, e.g., the cells are located at a park or venue in which the UEs are mostly expected to UEs carried by pedestrians who are slow moving or remaining in the area for an extended length of time. Legend 303 indicates that a cell with good performance and with no reboot issue is represented by a solid line, while a cell with poor performance or a reboot issue is represented by a dashed line.

In drawing 302, small cell base station 304, which has a corresponding cellular coverage area 305, is a cell with good performance and does not have a reboot issue; small cell base station 306, which has a corresponding cellular coverage area 307, is a cell with good performance and does not have a reboot issue; small cell base station 308, which has a corresponding cellular coverage area 309 is a cell with poor performance or a cell which has a reboot issue; small cell base station 310, which has a corresponding cellular coverage area 311 is a cell with good performance and does not have a reboot issue; and small cell base station 312, which has a corresponding cellular coverage area 312 is a cell with poor performance or a cell which has a reboot issue. In this case it makes more sense to turn-off these identified problem cells, with poor performance or reboot issues, as the UEs within those cells are expected to experience poor performance for an extended period of time. Thus, in this case the radios of small cell base station 310 and small cell base station 312 will be turned off, and UEs in those areas with use the back-up MVNO large cell to communicate data.

FIG. 4 is a drawing 400 including drawing 402 illustrating an exemplary third deployment case and a corresponding legend 403. In drawing 402 a plurality of small cells (e.g., within MNO cells 114) in the first MNO wireless network of FIG. 1, which are under the control of automatic management entity 202, are deployed such that two small cells and underlying cells with respect to a third small cell. In some other embodiments, base station 404 is a large cell MVNO base station. Legend 403 indicates that a cell with good performance and with no reboot issue is represented by a solid line, while a cell with poor performance or a reboot issue is represented by a dashed line.

In drawing 402, base station 404, which has a corresponding cellular coverage area 405, is a cell with good performance and does not have a reboot issue; small cell base station 406, which has a corresponding cellular coverage area 407, is a cell with poor performance, e.g., a cell capacity issue, or a cell which has a reboot issue; and small cell base station 408, which has a corresponding cellular coverage area 409, is a cell with poor performance, e.g., a cell capacity issues, or a cell which has a reboot issue. Since the two problematic cells, corresponding to small cell base stations 406, 408, are underlying cells, with respect to the good performing cell with cellular coverage area 405 corresponding to base station 404, the small cells with issues can be turned off until the issues are resolved, and the UEs, e.g., including exemplary UE 412 can use base station 404 to communicated data.

In various embodiments, in accordance with the present invention, technical criteria and a deployment scheme are used by evaluator 140 of the automatic management entity in deciding if a cell, e.g., a cell in the first MNO wireless network with poor performance or a reboot issue, should be kept on or should be turned off from being used in the system. In addition, in some embodiments, based on use cases, it can be, and sometimes is, determined, e.g. by the automatic management entity 102, which cells should be prioritized for fixing. In addition, in some embodiments, a Net Present Value (NPV) can be, and sometimes is, determined based on churn. The churn and/or NPV is used in some embodiments in determining prioritization for fixing, e.g., cells which may be providing poor performance in a cluster, i.e., poor throughput, drops, and/or transitions.

Exemplary prioritization for fixes, in accordance with some embodiments of the present invention will now be described. The automatic management entity 102 will look at the offload data and impact to the UEs and overall network in the absence of a cell, for each of the identified problematic cells, and then assign priorities to fixing problematic cells. Cells with high offload will have a higher priority for resolution as compared to cells in suburban areas or high traffic sites. A cell causing UE impact due to transfer between MVNO and MNO networks, i.e., excessive handoffs, will be prioritized higher to be fixed than cells at the edge of a cluster.

Figure 5:
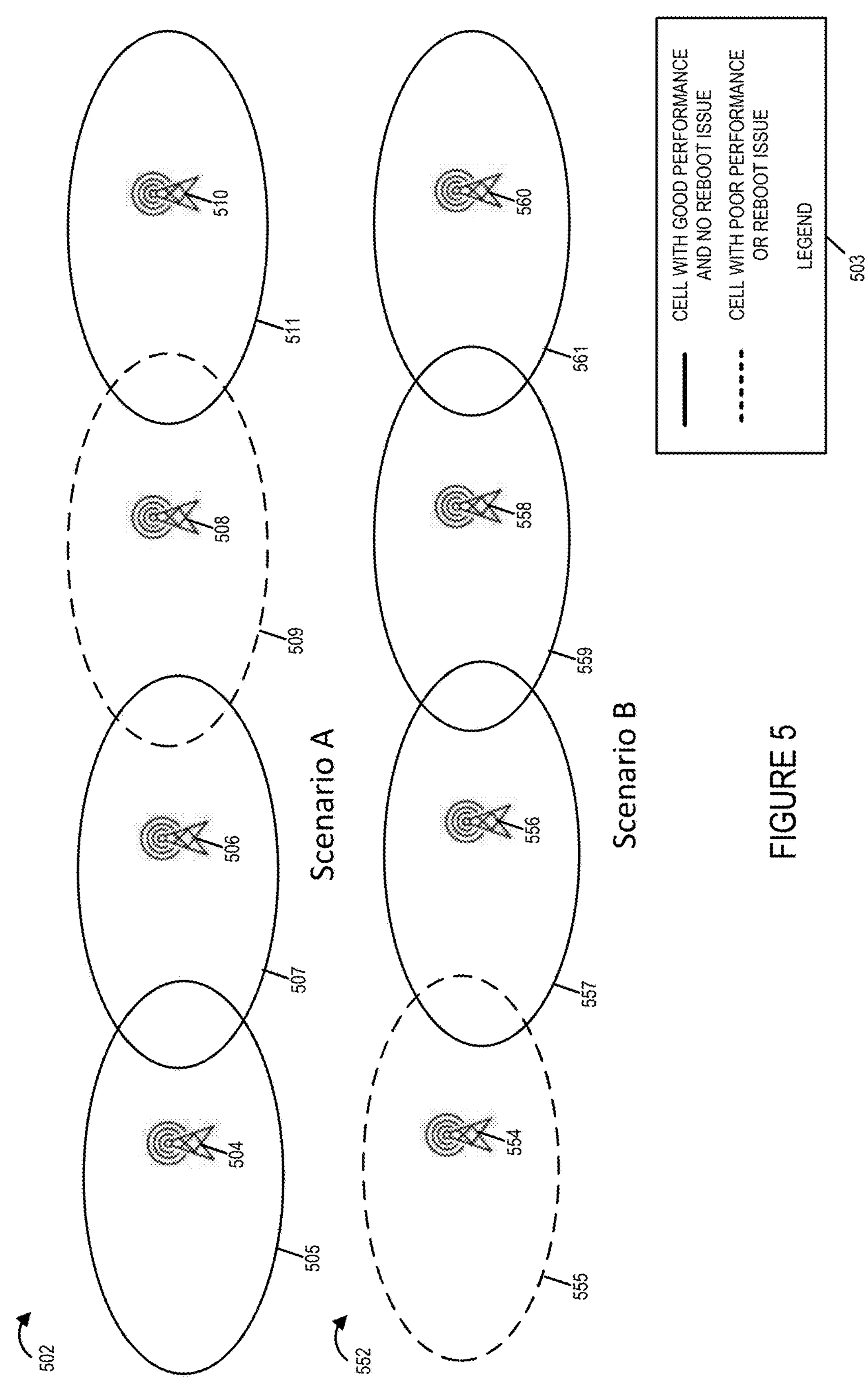
FIG. 5 illustrates exemplary prioritization for fixing identified problem cells in a mobile wireless network, in which fixing problem edge cells are favored over fixing problem intermediate cells, other factors being equal.

FIG. 5 is a drawing 500 illustrating two scenarios, scenario A represented by drawing 502 and scenario B represented by drawing 552, in which one of the cells in a set of cells providing contiguous coverage in a first MNO, is experiencing poor performance or having a reboot issues, and the other cells in the set of cells are experience good performance with no reboot issues. Drawing 502 and 552 may each represent a cell cluster covering a street. FIG. 5 further includes legend 503, which indicates that a cell with good performance and with no reboot issue is represented by a solid line, while a cell with poor performance or a reboot issue is represented by a dashed line.

In drawing 502, corresponding to scenario A, small cell base stations (504, 506, 510), with corresponding cellular coverages (505, 507, 511), respectively, are experiencing good performance with no reboot issues, while small cell base station 508 with corresponding cellular coverage area 509 is a cell with poor performance or a reboot issue. In drawing 502 of scenario A, the problematic cell, corresponding to base station 508 and cellular coverage area 509, is an intermediate located cell withing the contiguous cellular coverage area.

In drawing 552, corresponding to scenario B, small cell base stations (556, 558, 560), with corresponding cellular coverages (557, 559, 561), respectively, are experiencing good performance with no reboot issues, while small cell base station 554 with corresponding cellular coverage area 555 is a cell with poor performance or a reboot issue. In drawing 552 of scenario 552, the problematic cell, corresponding to base station 554 and cellular coverage area 555, is at a network edge located cell within the contiguous cellular coverage area.

In FIG. 5, for an example with cells with comparable or the same offload, it is desirable to fix the issue of scenario A before fixing the issue of scenario B, as the cell (base station 554 with cellular coverage area 555) with issues in scenario B is at the edge, while the cell (base station 508 with cellular coverage area 508) is at an intermediate location.

In various embodiments, prioritization for fixing identified problematic cells is based on coverage, location, and presence of alternative options. In addition, the type of expected traffic (high speed type traffic, low speed type traffic, etc.), is another factor used, e.g., by the automatic management entity, in deciding whether to un-manage a cell or keep the cell managed.

In some embodiments, exemplary alternative scenarios and/or factors to be used for consideration are manually entered, e.g., via input criteria entry device 138, and prioritization for fixes is automatically determined by the automatic management entity 102 based on the coverage, alternatives and other information available.

Various aspects of the architecture, used in some embodiments of the present invention, will now be described. In various embodiments, a report based on the defined criteria and how a cell was impacting the end user performance will be produced, e.g., by the automatic management entity, based on the data used for evaluations, and the generated report will be sent to the cloud reporting device 136. Various criteria defining the KPIs, resets per hour and/or other geographically or manually inserted data is input to the automatic management entity 138, via input/criteria entry device 138, to define trigger conditions, e.g. trigger conditions, e.g., for deciding to transition a managed cell to unmanaged.

Figure 6A:
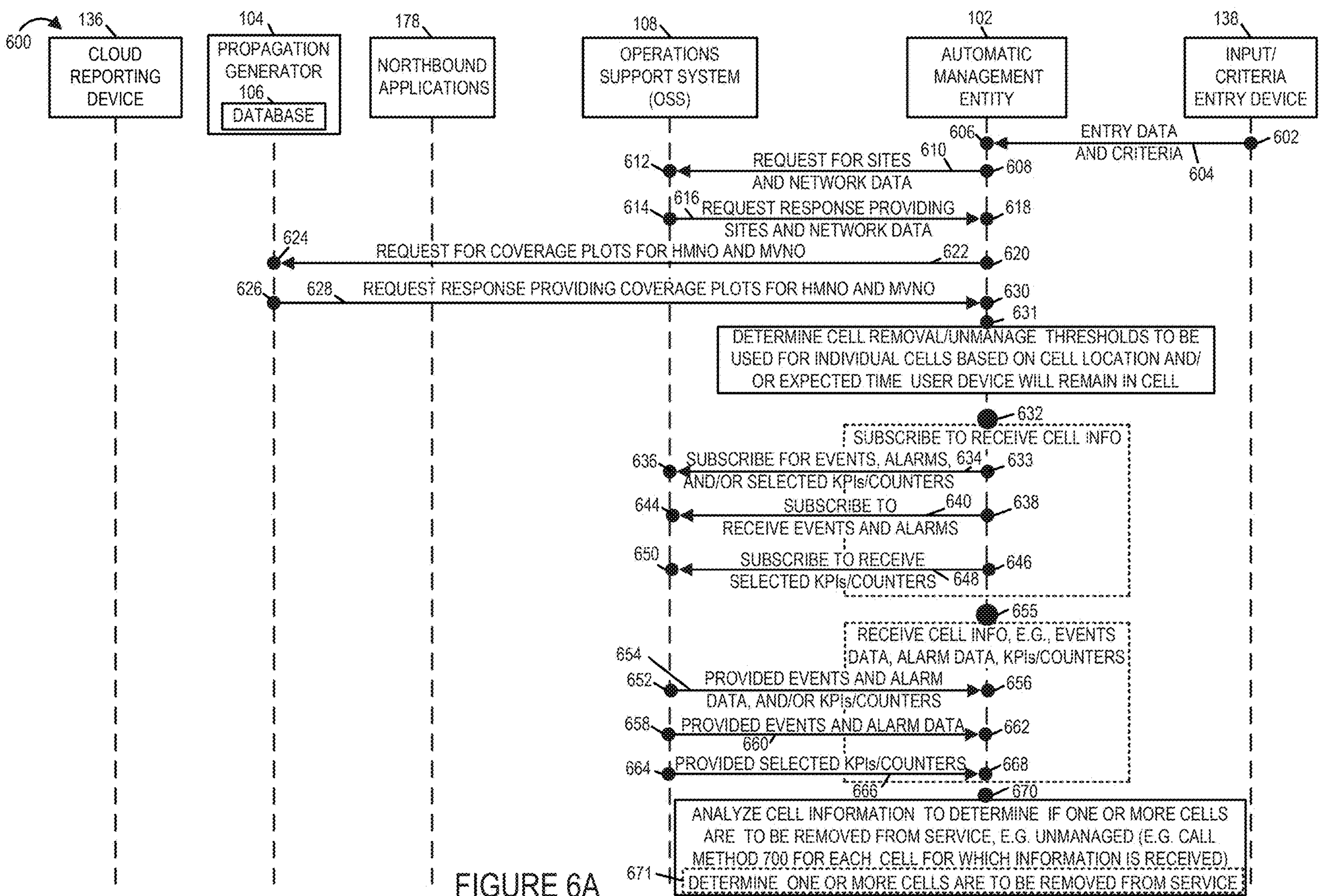
FIG. 6A is a first part of a signaling diagram illustrating an exemplary messaging sequence for un-management of cells in a wireless network in accordance with an exemplary embodiment.
Figure 6B:
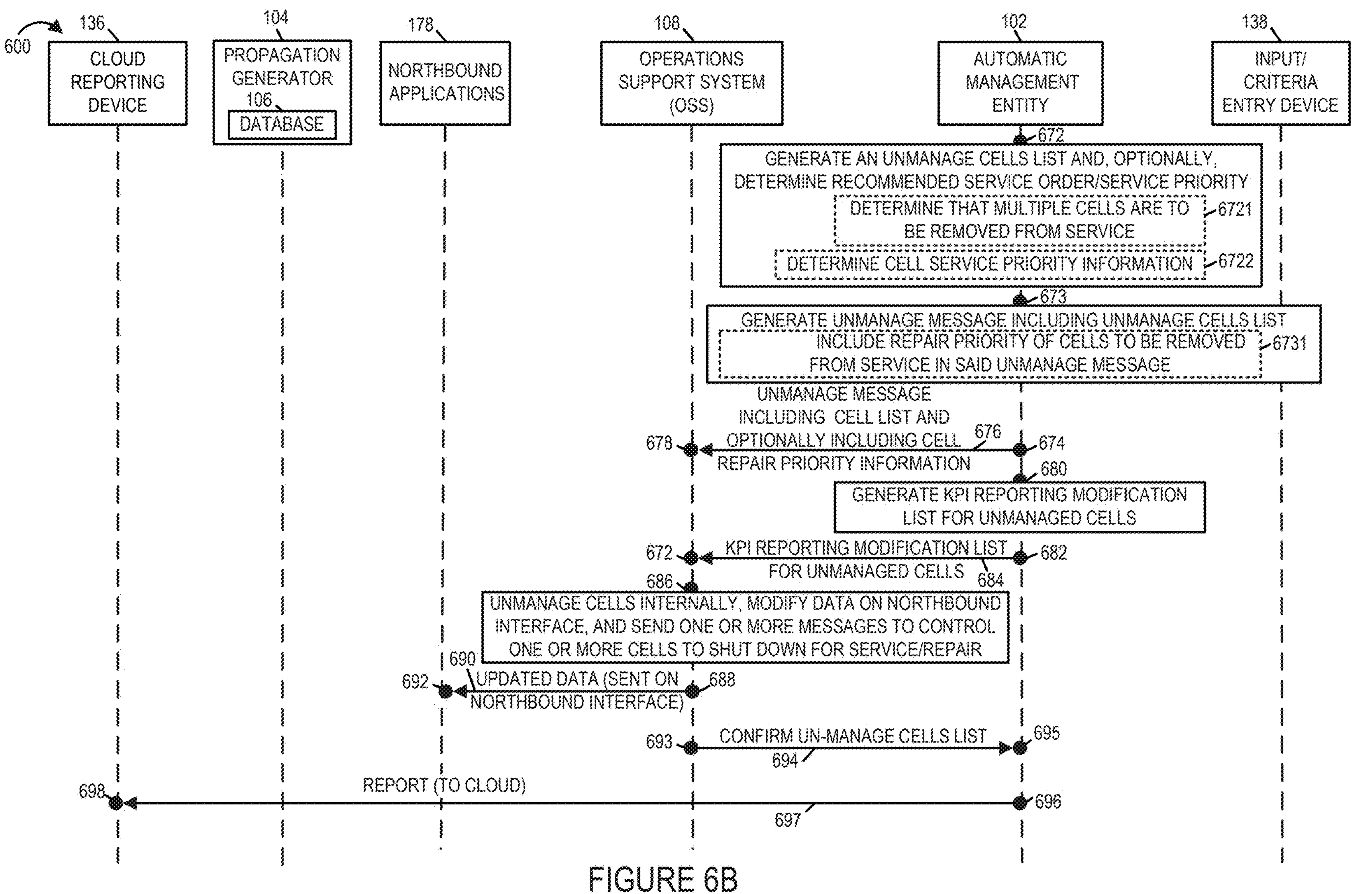
FIG. 6B is a second part of a signaling diagram illustrating an exemplary messaging sequence for un-management of cells in a wireless network in accordance with an exemplary embodiment.

FIG. 6, comprising the combination of FIG. 6A and FIG. 6B, illustrates an exemplary signaling diagram 600, comprising Part A 601 and Part B 603, said signaling diagram 600 including a message sequence for un-management of cells, in accordance with an exemplary embodiment. Signaling diagram 600 includes automatic management entity 102, propagation generator 104, propagation database 106, operations support system (OSS) 108, cloud reporting device 136, and input/criteria entry device 138. Database 106 is included as part of propagation generator 104 or propagation generator 104 is coupled to the database 106 and has access to the information in the database 106.

In step 602, the input/criteria entry device 138 receives information and criteria, e.g., from a system administrator, generates message 604 communicating entry data and criteria, and sends the generated message 604 to automatic management entity 102. In step 606 the automatic management entity 102 receives the message 604 and recovers the communicated data and criteria. In step 608, the automatic management entity 102 generates and sends message 610 to operations support system 612. Message 610 includes a request for sites and network data. In step 612 the OSS receives the request message 610. In step 614, the OSS responds to the request, accesses information, generates a request response message 616 providing site information and network data, and sends the request response message 618 to automatic management entity 102. In step 618 the automatic management entity 102 receives the request response message 616 and recovers the communicated information. In step 620, the automatic management entity 102 in step 620 generates and sends a request 622 for coverage plots for HMNO and MVNO wireless networks, e.g., the automatic management entity 102 requests coverage plots for a wireless network of the HMNO, e.g., small cell wireless network operated by a first MNO, e.g., Charter, and requests coverage plots for a MVNO wireless network using physical resources of a second MNO, e.g., Verizon, to propagation generator 104. In step 624, the propagation generator 104 receives the request for coverage plots for HMNO and MVNO, and accesses information from propagation database 106 corresponding to the first MNO network and the MVNO network. In step 626, the propagation generator 104 generates a request response 628 including coverage plots for the HMNO and MVNO networks, and sends the generated request response 638 to the automatic management entity 102, which receives the request response 628 in step 630 and recovers the communicated information.

In step 631 the automatic management entity determines cell removal/unmanage thresholds to be used for individual cells, e.g., in the first MNO network, based on cell location and/or expected time user devices will remain in the cell. Operation proceeds from step 631 to step 632.

In step 632 the automatic management entity 102 subscribes to the OSS 108 to receive cell information, e.g. for the cells of the first MNO network. Step 632 includes one or more of steps 633, 638 and 646. In some embodiments, step 632 includes step 633 the automatic management entity 102 generates and sends message 634 to OSS 108 to subscribe for events, alarms, and/or selected Key Performance Indicators (KPIs)/counters. In step 634 the OSS receives the subscription request message 634, accepts the request, and configures the OSS to subsequently provide information corresponding to the subscription request to the automatic management entity 102.

In some embodiments, rather than sending a single subscribe message 634, the automatic management entity 102 generates and sends a plurality of different subscribe messages to the OSS 108, and step 632 includes step 638 and step 646. In step 638 the automatic management entity 102 generates and sends message 640 to OSS 108 to subscribe for events and alarms. In step 644 the OSS 108 receives the subscription request message 640, accepts the request, and configures the OSS to subsequently provide information (event information and alarm data) corresponding to the subscription request 640 to the automatic management entity 102. In step 646 the automatic management entity 102 generates and sends message 648 to OSS 108 to subscribe for selected KPIs/counters. In step 650 the OSS 108 receives the subscription request message 648, accepts the request, and configures the OSS to subsequently provide information (KPI information and counter information) corresponding to the subscription request 650 to the automatic management entity 102.

In step 655, which may be performed multiple times, the automatic management entity 102, receives cell information, e.g., event data, alarm data, and/or KPIs/counters. Step 655 includes one or more of steps 656, 662 and 668, e.g., depending upon the configuration implemented. In step 652, the OSS 108 generates and sends notification message 654 to automatic management entity 102, said notification message 654 providing events data, alarm data, and/or KPIs/counters. In step 656, the automatic management entity receives the notification message 654 and recovers the communicated information. In step 658, the OSS 108 generates and sends notification message 660 to automatic management entity 102, said notification message 660 providing events data and/or alarm data. In step 662, the automatic management entity 102 receives the notification message 660 and recovers the communicated information. In step 664, the OSS 108 generates and sends notification message 666 to automatic management entity 102, said notification message 666 providing selected KPIs/counters. In step 668, the automatic management entity receives the notification message 666 and recovers the communicated information.

In some embodiments, step 655 is performed repeatedly, e.g., on a recurring basis, e.g., at regular predetermined time intervals. In some embodiments, step 655 is performed intermittently, e.g., in response to detected events, alarms, detected KPI levels, and/or detected counts, e.g., with a notification message being sent immediately following a detected event or condition. In some embodiments, some types of information, e.g., lower priority information, is sent on a predetermined schedule, while high priority information is sent immediately in response to a detected condition.

Operation proceeds from step 655 to step 670. In step 670 the automatic management entity 102 analyzes cell information to determine if one or more cells are to be removed from service, e.g., unmanaged. In some embodiments, as part of step 670, the automatic management entity calls a subroutine implementing the method of flowchart 700 of FIG. 7 for each cell for which information is received to determine if the cell is to be removed from service, e.g., unmanaged.

Figure 7A:
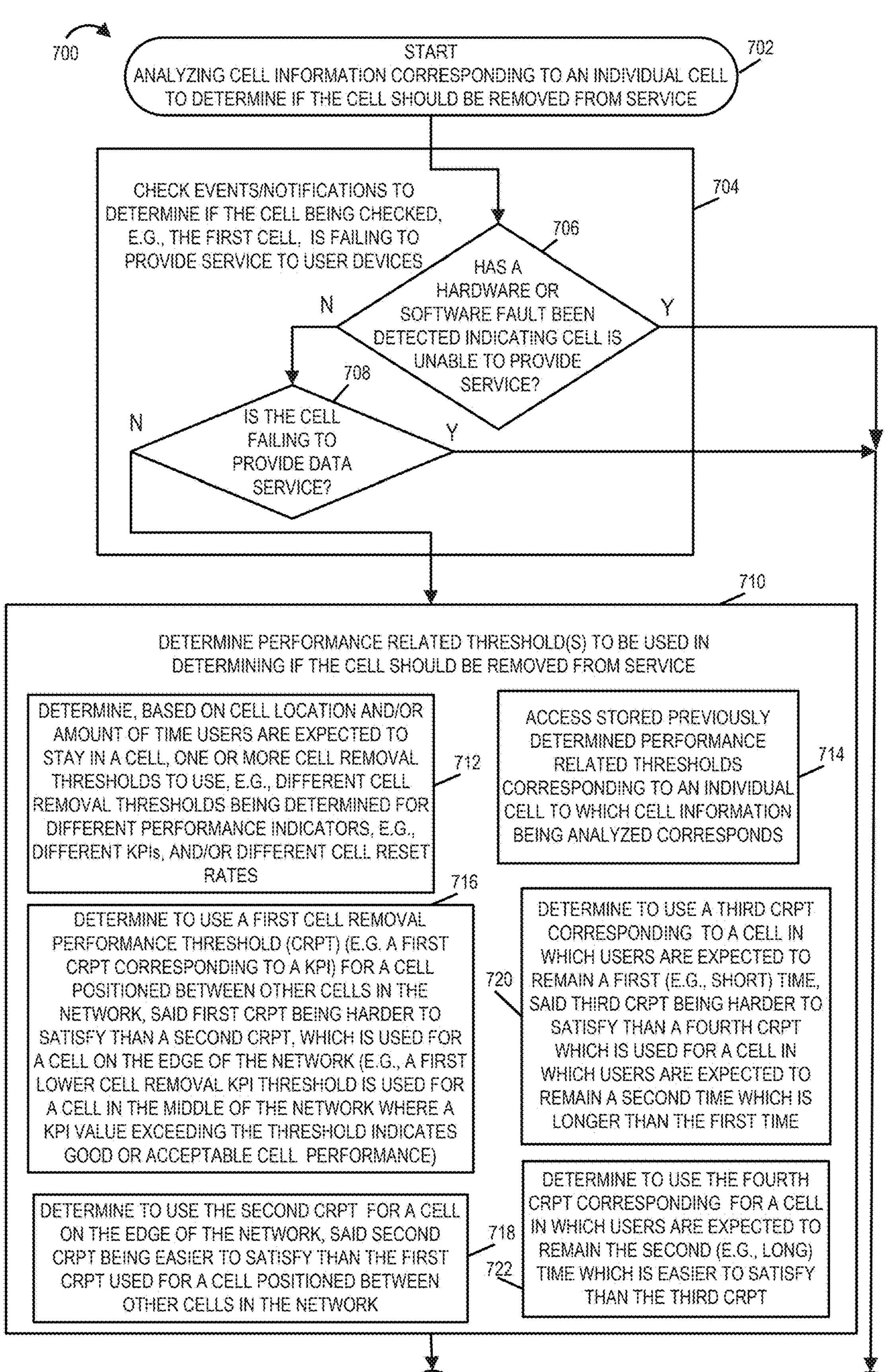
FIG. 7A is a first part of a flowchart of an exemplary method of analyzing cell information corresponding to an individual cell to determine if the cell should be removed from service in accordance with an exemplary embodiment.
Figures 7, 7B:
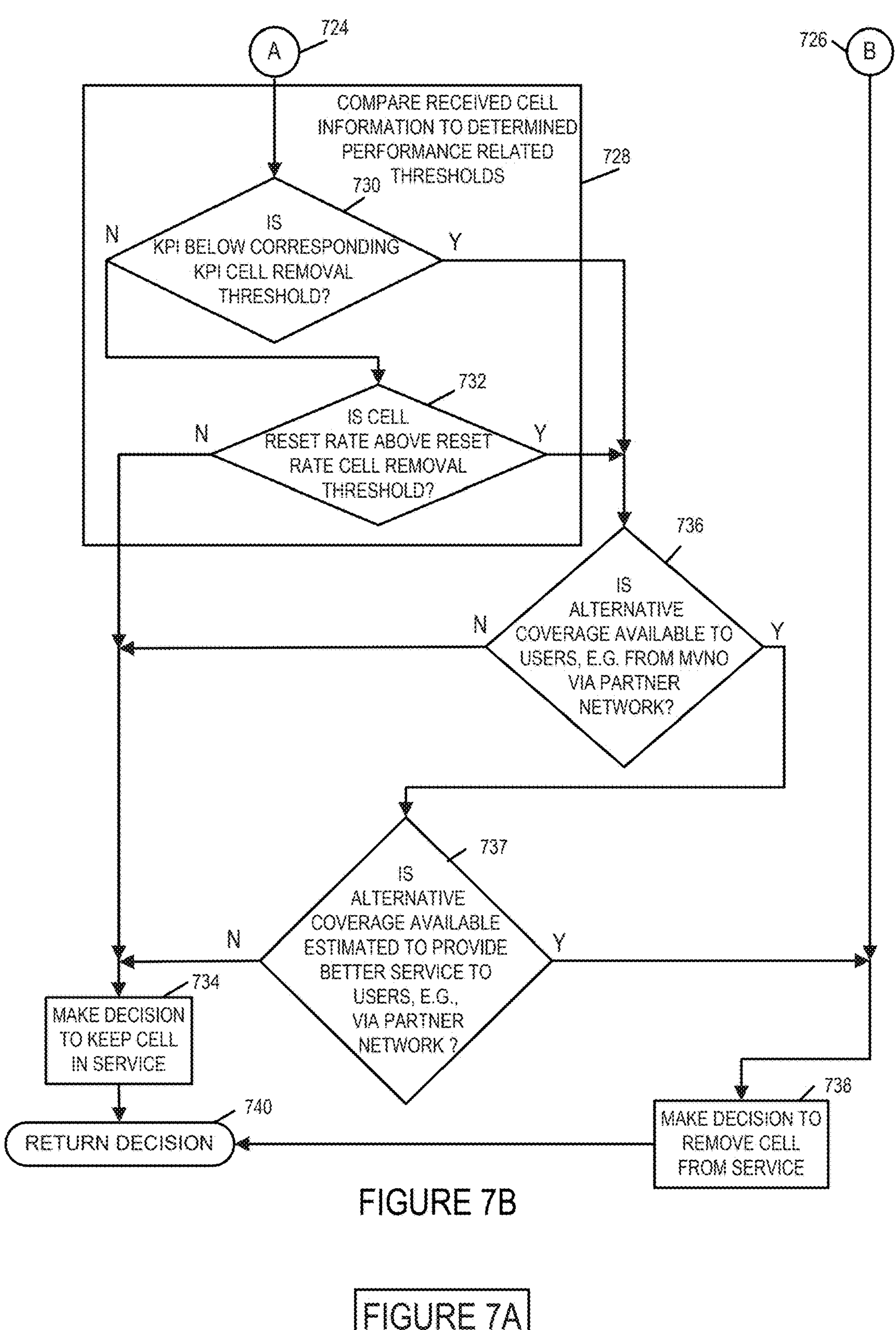
FIG. 7B is a second part of a flowchart of an exemplary method of analyzing cell information corresponding to an individual cell to determine if the cell should be removed from service in accordance with an exemplary embodiment.
FIG. 7 comprises the combination of FIG. 7A and FIG. 7B.

FIG. 7, comprising the combination of FIG. 7A and FIG. 7B, is a flowchart 700 of an exemplary method of analyzing cell information corresponding to an individual cell to determine if the cell should be removed from service. The exemplary method of flowchart 700 is performed by automatic management entity 102, e.g., by the evaluator 140 of the automatic management entity 102. Operation of the exemplary method starts in step 702 and proceeds to step 704. In step 704 the automatic management entity 102 checks events/notifications to determine if the cell being checked, e.g., a first cell, is failing to provide service to user devices. Step 704 includes step 706 and step 708. In step 706 the automatic management entity 102 determines if a hardware or software fault has been detected indicating that the cell is unable to provide service. If the determination is that a hardware or software fault has been detected indicating that the cell is unable to provide service, then operation proceeds from step 706 via connecting node B 726 to step 738, in which the automatic management entity 102 makes a decision to remove the cell from service. Alternatively, if the determination of step 706 is that a hardware or software fault has not been detected indicating that the cell is unable to provide service, then operation proceeds from step 706 via connecting node B 726 to step 708.

In step 708 the automatic management entity 102 determines whether or not the cell is failing to provide data service. If the determination is that the cell is failing to provide data service, then operation proceeds from step 708 via connecting node B 726 to step 738, in which the automatic management entity 102 makes a decision to remove the cell from service. Alternatively, if the determination of step 708 is that the cell is not failing to provide data services, then operation proceeds from step 708 to step 710. In step 710 the automatic management entity 102 determines performance related threshold(s) to be used in determining if the cell should be removed from service. Step 710 includes one or more of steps 712, 714, 716, 718, 720, and 722.

In step 712 the automatic management entity 102 determines, based on cell location and/or amount of time users are expected to stay in a cell, one or more cell removal thresholds to use, e.g., different cell removal thresholds being determined for different performance indicators, e.g., different KPIs, and/or different cell reset rates. In step 714 the automatic management entity 102 accesses stored previously determined performance related thresholds corresponding to an individual cell to which cell information being analyzed corresponds. In step 716 the automatic management entity 102 determines to use a first cell removal performance threshold (CRPT), e.g., a first CRPT corresponding to a KPI, for a cell positioned between other cells in the network, said first CRPT being harder to satisfy than a second CRPT, which is used for a cell on the edge of the network. For example, a first lower cell removal KPI threshold is used for a cell in the middle of a network where a KPI value exceeding the threshold indicates good of acceptable threshold performance, than the second cell removal KPI threshold used for a cell at the edge of the network. In step 718 the automatic management entity 102 determines to use the second CRPT for a cell on the edge of the network, said second CRPT being easier to satisfy than the first CRPT used for a cell positioned between other cells in the network. In step 720 the automatic management entity 102 determines to uses a third CRPT corresponding to a cell in which users are expected to remain a first, e.g., short, time, said third CRPT being harder to satisfy than a fourth CRPT which is used for a cell in which users are expected to remain a second time which is longer than said first time. In step 722 the automatic management entity 102 determines to use a fourth CRPT corresponding to a cell in which users are expected to remain a second, e.g., long, time which is easier to satisfy than said third CRPT. Operation proceeds from step 710, via connecting node A 724, to step 728.

In step 728 the automatic management entity 102 compares received cell information to determined performance related thresholds. Step 728 includes steps 730 and 732. In step 730 the automatic management entity 102 determines if a received KPI is below a determined corresponding KPI cell removal threshold. If the determination of step 730, is that the received KPI is below the determined corresponding KPI cell removal threshold, then operation proceeds from step 730 to step 736. Alternatively, if the determination of step 730, is that the received KPI is not below the determined corresponding KPI cell removal threshold, then operation proceeds from step 730 to step 732. In step 732 the automatic management entity 102 determines if a received cell reset rate is above a determined reset rate cell removal threshold. If the determination of step 732, is that the received cell reset rate is above the determined reset rate cell removal threshold, then operation proceeds from step 730 to step 736. Alternatively, if the determination of step 732, is that the received cell reset rate is not above the determined reset rate cell removal threshold, then operation proceeds from step 730 to step 734, in which the automatic management entity 102 makes a decision to keep the cell in service.

Returning to step 736, in step 736 the automatic management entity 102 determines whether or not there is alternative coverage available to users, e.g., from a MVNO via a partner network, e.g., based on whether or not the coverage area for the cell in first MNO which is being evaluated is included within the coverage areas of one or more cells of the MNVO, e.g., using provided coverage plot information obtained from the propagation generator 104 and the propagation database 106. If the determination of step 736, is that alternative coverage is available, then operation proceeds from step 736 to step 737.

Alternatively, if the determination of step 736 is that alternative coverage is not available, then operation proceeds from step 736 to step 734, in which the automatic management entity 102 makes a decision to keep the cell in service.

Returning to step 737, in step 737, the automatic management entity 102 determines whether or not the alternative coverage, which is available, e.g., via the partner network, is estimated to provide better service to users than the service which can be provided by the cell being analyzed if it remains in service. If the determination of step 737 is that the alternative coverage available is estimated to be able to provide better service to users, e.g., via the partner network, then operation proceeds from step 737 to step 738, in which the automation management entity 102 makes a decision to remove the cell from service. Alternatively, if the determination of step 737 is that the alternative coverage which is available is estimated to be unable to provide better service to users, then operation proceeds from step 737 to step 734, in which the automation management entity 102 makes a decision to keep the cell in service.

Operation proceeds from either step 734 or step 738 to return decision step 740, in which the subroutine returns to decision result to main routine step 670 of FIG. 6A.

The method of flowchart 700 may be, and sometimes is, performed multiples times, e.g. once for each cell for which data is being analyzed to make a determination as to whether or not that particular cell should be removed from service or is to remain in service.

Step 670 may and sometime does, include step 671 in which the automatic management entity 102 determines that one or more cells are to be removed from service.

In step 672, based on the determination results obtained in step 670, the automatic management entity 102 generates an unmanage cell list, and optionally, determines recommended service order/service priority, e.g., the automatic management entity generates a list of cells to be removed from service and optionally prioritizes the order in which the identified problems cells should be fixed, e.g. repaired or replaced and returned to service. In some embodiments, step 672 includes step 6721 in which the automatic management entity 102 determines that multiple cells are to be removed from service. In some such embodiments, in response to determining in step 6721 that multiple cells are to be removed from service, the automatic management entity 102 performs step 6722 in which the automatic management entity 102 prioritizes cells for repair (e.g., where the prioritization is based on one, more than one, or all of: i) the amount of data traffic being supported by the cell (e.g., with a cell providing more offload (e.g., communication) of data being prioritized over another cell being removed from service providing less offload (communication) of data; ii) location of cell within the network (e.g., prioritize cells in center of network for repair over cells at edge of network to avoid handoffs to alternative provider when a UE is can likely be handed off to another cell in the network in the future than when at the cell edge where the UE is likely to move out of the network coverage in the near future). Operation proceeds from step 672 to step 673.

In step 673 the automatic management entity 102 generates an unmanage message 676 including the unmanage cells list identifying the cells to be removed from service. In some embodiments, step 673 may, and sometimes does, includes step 6731, in which the automatic management entity includes repair priority of cells to be removed from service in the unmanage message 676.

In step 674 the automatic management entity automatically sends an unmanage message 676 to the OSS 108 to initiate one or more cells to be removed from service, said unmanage message included the unmanage cell list and optionally including recommended service order/service priority information. In step 676 the OSS 108 receives unmanage message 676 and recovers the communicated information, e.g., unmanage cells list and repair priority information, if provided.

In step 680 the automatic management entity generates a KPI reporting modification list for unmanaged cells. In step 682 the automatic management entity 102 generates and sends a message 684 including the generated KPI reporting modification list for unmanaged cells to the OSS 108, which receives the message 684 in step 672 and recovered the communicated KPI reporting modification list for unmanaged cells.

In step 686 the OSS 108 unmanages cells internally, e.g., based on the cells identified in the received unmanage message cell list, modifies data on the northbound interface, e.g., based on the received KPI reporting modification list for unmanaged cells, and sends one or more messages to one or more cells (unmanaged cells) to shut down for service/repair.

In step 688 the OSS 108 sends updated data 690 on the northbound interface to northbound applications 178, which is received by the northbound applications in step 690.

In step 693 the OSS 108 generates and sends a confirm unmanage cells list message 694 to the automatic management entity 102. In step 695 the automatic management entity 102 receives the confirm unmanage message 694 in step 695 and recognizes that the cells on the unmanage cells list have been successfully unmanaged. In response to the received confirmation message 694, the automatic management entity 102, in step 696 generates and sends a report 697 to the cloud reporting device 136, which is received and recovered in step 698. In some embodiments, the report 697 includes information identifying which cell or cells have been transitioned to unmanaged, the criteria and data upon which each cell unmanage decision was based, and the issue for each cell to be transitioned to unmanaged state, e.g. throughput, rebooting, unable to provide data, etc.

After one or more cells are unmanaged and removed from service, the cell(s) may be repaired or replaced and returned to service. Once the cells are back in service, the cells are tested and entered in the system. The automatic management entity 102 works on the list and with the OSS 102 brings the cells in an unmanaged state back to the managed state.

Figure 8:
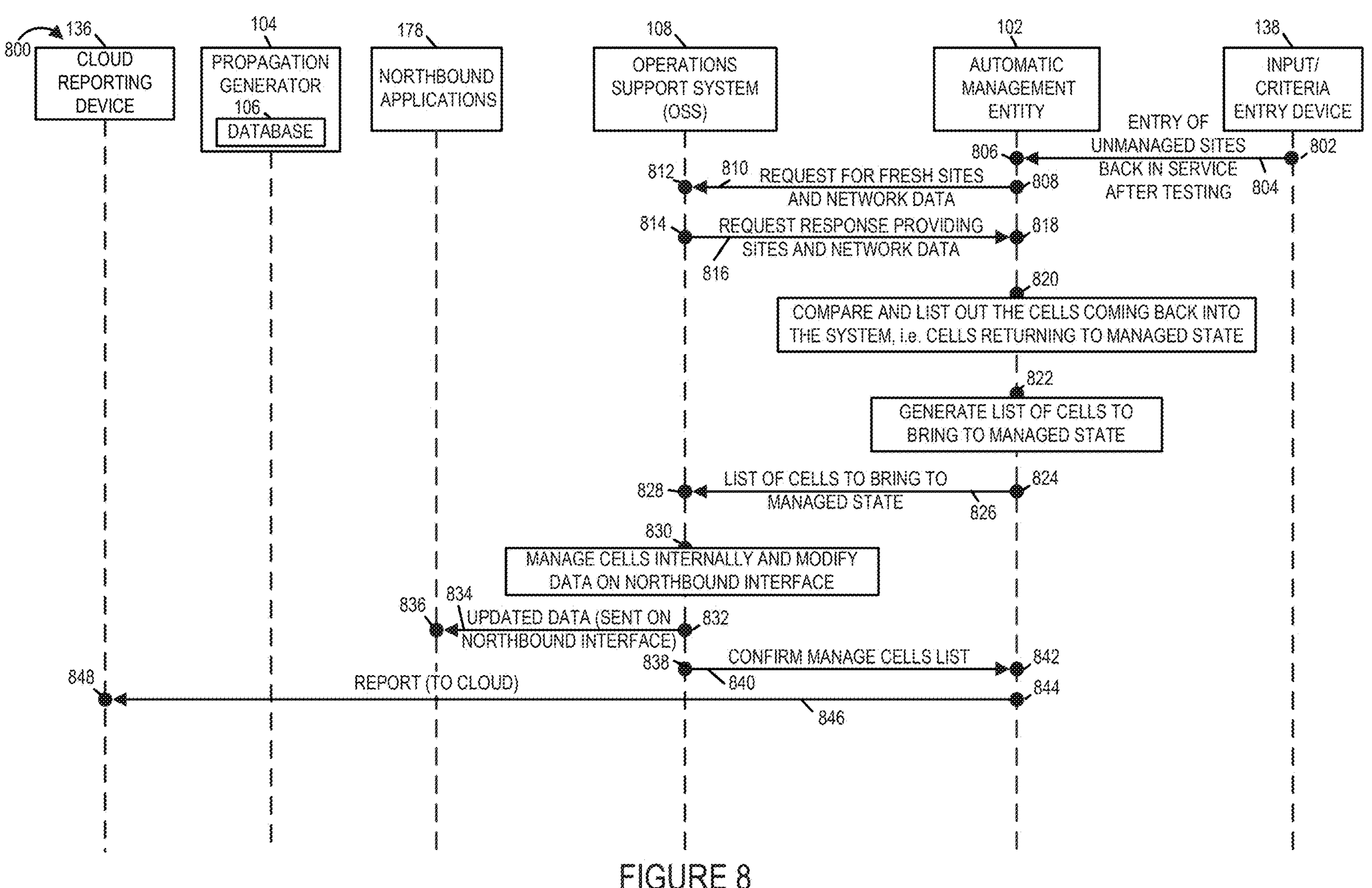
FIG. 8 is a signaling diagram illustrating an exemplary messaging sequence for management of cells in a wireless network, following automatic un-management of one or more cells, in accordance with an exemplary embodiment.

FIG. 8 is a signaling diagram 800 illustrating an exemplary messaging sequence for management of cells in a wireless network, following automatic un-management of one or more cells, in accordance with an exemplary embodiment.

Figure 9:
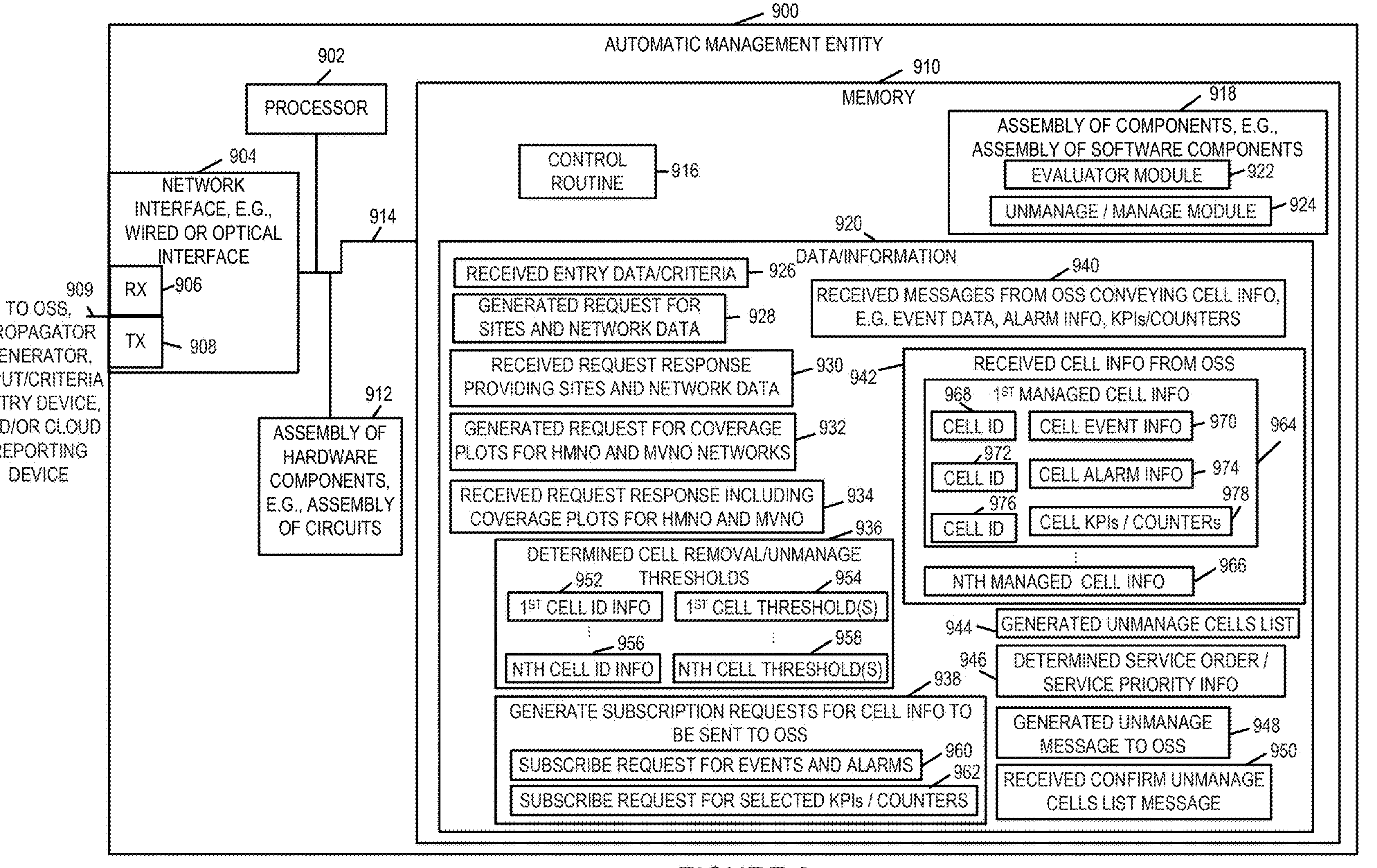
FIG. 9 is a drawing of an exemplary automatic management entity in accordance with an exemplary embodiment.

In step 802 the input/criteria entry device 138 generates and sends a message 804 communicating entry information identifying unmanaged sites (cells) which are now back in service following repair or replacement and successful testing, e.g., based on user, e.g. system administrator, input. In step 806 the automatic management entity 102 receives the message 804 and recovers the communicated information. In step 808, the automatic management entity 102 generates a request 810 for fresh sites, e.g., corresponding to repaired cells (base stations) which have been restored to service or new cells (base stations) which are intended to replace cells which were previously taken out of service, and a request for network data, and sends the generated request 810 to the OSS 108. In step 812, the OSS receives and processes the request. In step 814, in response the received request 810, in step 814, the OSS 108 generates a request response message 816 and sends the request response message 816 to the automatic management entity 102, said request response message providing sites and network data. In step 818, the automatic management entity 102 receives the request response message 816 and recovers the communicated information. In step 820 the automatic management entity 102 performs a comparison and lists out the cells coming back into the system, i.e., to the managed state. In step 822 the automatic management entity 102 generates a list of cells to bring to managed state. In step 824 the automatic management entity 102 generates and sends a message 826 communicating a list of cells to bring to a managed state. In step 828 the OSS 108 receives message 826 and recovers the list of cells to bring to a managed state. In step 830 the OSS manages cells internally and modifies data on a northbound interface. In step 832 the OSS 108 generates and sends updated data 834 on the northbound interface of the OSS 108 to northbound applications 178. In step 836 the northbound applications 178 receive the communicated updated data 834, corresponding to the cells which have been transitioned into a managed state. In step 838 the OSS 108 generates and sends a confirmation message 840 to the automatic management entity 102, which confirms that the cells of list of cells requested to be brough to managed state of message 826 have been transitions to managed state and are now being managed by the OSS 108. In step 842, the automatic management entity 102 receives the confirmation message 840, and in response, in step 844 the automatic management entity 102 generates and sends a report 846 to the cloud reporting device 136. The cloud reporting device 136 receives the report 846 in step 848, recovers the communicated information, e.g. updating the current status of the system, FIG. 9 is a drawing of an exemplary automatic management entity 900 in accordance with an exemplary embodiment. Exemplary automatic management entity 900 of FIG. 9 is, e.g., automatic management entity 102 of system 100 of FIG. 1, automatic management entity 102 of signaling diagram 600 of FIG. 6, automatic management entity 102 of signaling diagram 800 of FIG. 8 and/or an automatic management entity implementing the method of flowchart 700 of FIG. 7.

Automatic management entity 900 includes a processor 902, e.g., a CPU, a network interface 904, e.g., a wired of optical interface, a memory 910, and an assembly of hardware components 912, e.g., an assembly of circuits, coupled together via a bus 914 over which the various elements may interchange data and information. Network interface 904 includes a receiver (RX) 906, a transmitter (TX) 908 and a connector 909. Network interface 904 couples the automatic management entity 900 to an OSS, a propagator generator, an input/criteria entry device(s), and/or a cloud reporting device.

Memory 910 includes a control routine 916, an assembly of components 918, e.g., an assembly of software components. Assembly of components 918 includes an evaluator module 922 and an unmanage/manage module 924. Control routine 916 includes instructions which when executed by processor 902 control the automatic management entity 900 to implement basic operational functions, e.g., read memory, write to memory, control an interface, load a program, subroutine, or app, etc. Assembly of components 918, e.g., an assembly of software components, e.g., routines, subroutines, applications, etc., includes, e.g., code, e.g., machine executable instructions, which when executed by processor 902, controls the automatic management entity 900 to implement steps of a method, e.g., steps of the method of signaling diagram 600 of FIG. 6 performed by automatic management entity 102, steps of method of flowchart 700 of FIG. 7, and/or steps of the signaling diagram 800 of FIG. 8 performed by the automatic management entity 102. In some embodiments, the method of flowchart 700 of FIG. 7 is performed by evaluator module 922.

Data/information 920 includes received entry data/criteria 926, a generated request 928 for sites and network data, a received request response 932 providing sites and network data, a generated request 932 for coverage plots for HMNO and MVNO network, a received request response 934 including coverage plots for HMNO and MVNO 936, determined cell removal/unmanage thresholds 936 and generated subscription requests 936 for cell information to be sent to OSS. The determined cell removal/unmanage thresholds 936 includes cell ID information and cell removal/unmanage thresholds corresponding to each cell ((1st cell ID information 952, 1st cell removal/unmanage thresholds 954), . . . , (Nth cell ID information 956, Nth cell removal/unmanage thresholds 958)). Generated subscription requests 938 for cell information include a subscribe request 960 for events and alarms and a subscribe request 962 for selected KPIs/counters. Data/information 920 further includes a received messages 940 from the OSS conveying cell information, e.g., event data, alarm information, and/or KPIs/counters, and received cell information 942 from the OSS extracted from or derived from the received cell information messages 940. Received cell information includes cell information corresponding to one or more cells (1st managed cell information 964, . . . , Nth managed cell information 966. Different sets of cell information may include different types of information, e.g., depending upon what is detected by the OSS. Exemplary first managed cell information 964 includes a cell ID 968 and corresponding cell event information 970, cell ID 972 and corresponding cell alarm information 974, and cell ID information 976 and corresponding selected KPIs and/or counters. Data/information 920 further includes a generated unmanage cell list 944, determined service order/service priority information 946 corresponding to the cell on unmanage cell list 944, a generated unmanage message 948 to be sent to the OSS, said unmanage message including the unmanage cell list 944 and optionally including the priority information 946, and a received confirm unmanage cells list message 950.

Figure 10:
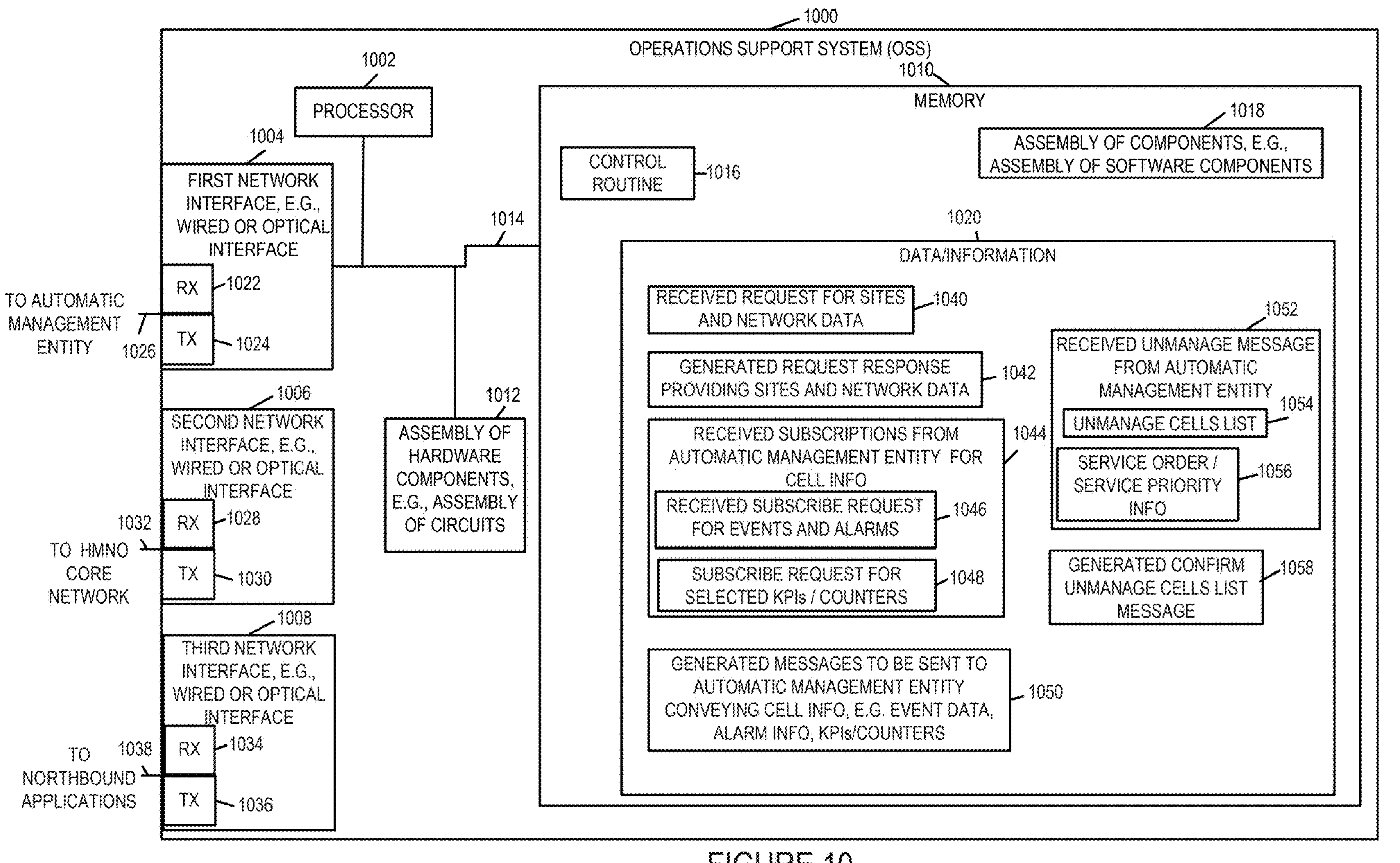
FIG. 10 is a drawing of an exemplary operations support system (OSS) in accordance with an exemplary embodiment.

FIG. 10 is a drawing of an exemplary operations support system (OSS) 1000 in accordance with an exemplary embodiment. Exemplary OSS 1000 is, e.g., OSS 108 of system 100 of FIG. 1, OSS 108 of signaling diagram 600 of FIG. 6 and/or OSS 108 of signaling diagram 800 of FIG. 8.

OSS 1000 includes a processor 1002, e.g., a CPU, a first network interface 1004, a second network interface 1006, a third network interface 1008, a memory 1010, and an assembly of hardware components 1012, e.g., an assembly of circuits, coupled together via a bus 1014 over which the various elements may interchange data and information. First network interface 1004, e.g., a wired or optical interface, includes a receiver (RX) 1022, a transmitter (TX) 1024 and a connector 1026. First network interface 1004 couples the OSS 1000 to an automatic management entity, e.g. automation management entity 102 of system 100 of FIG. 1. Second network interface 1006, e.g., a wired or optical interface, includes a receiver (RX) 1028, a transmitter (TX) 1030 and a connector 1032. Second network interface 1006 couples the OSS 1000 to a HMNO core network, e.g., HMNO core network 110 of system 100 of FIG. 1. Third network interface 1008, e.g., a wired or optical interface, includes a receiver (RX) 1034, a transmitter (TX) 1036 and a connector 1038. Third network interface 1008, which is a northbound interface, couples the OSS 1000 to northbound applications.

Memory 1010 includes a control routine 1016, an assembly of components 1018, e.g., an assembly of software components. Control routine 1016 includes instructions which when executed by processor 1002 control the OSS 1000 to implement basic operational functions, e.g., read memory, write to memory, control an interface, load a program, subroutine, or app, etc. Assembly of components 1018, e.g., an assembly of software components, e.g., routines, subroutines, applications, etc., includes, e.g., code, e.g., machine executable instructions, which when executed by processor 1002, controls the OSS 1000 to implement steps of a method, e.g., steps of the method of signaling diagram 600 of FIG. 6 performed by OSS 108, and/or steps of the signaling diagram 800 of FIG. 8 performed by OSS 108.

Data/information 1020 includes a received request 1040 for sites and network data, a generated request response 1040 providing sites and network data, received subscription (s) 1044 for cell information from an automatic management entity. The received subscriptions 1044 include a received subscribe request 1046 for events and data and a received subscribe request for selected KPIs/counters. Data/information 1010 further includes generated messages 1050 to be sent to an automatic management entity, said generated messages 1050 conveying cell information, e.g., event data, alarm information, and/or KPIs/counters. Data/information 1010 further includes a received unmanage message 1052 from an automatic management entity, said received unmanage message 1052 including an unmanage cells list 1054 identifying cells to be transitioned into an unmanaged state by the OSS and optionally including service order/service priority information 1056, e.g., including information ranking the order that it is desired that the identified unmanaged cells on the list 1054 be repaired/replaced and returned to service. Data/information 1010 further includes a generated confirm unmanage cells list message 1058 to be sent to the automatic management entity to notify the automatic management entity that cells on the unmanaged list have been transitioned into an unmanaged state.

NUMBERED LIST OF EXEMPLARY METHOD EMBODIMENTS

Method Embodiment 1. A method of operating an automatic network management entity (102), the method comprising: subscribing (632) to an operations support system (OSS) (108) to receive cell information (e.g., events, alarms and/or KPI information) (e.g., subscribe in step 632 to receive network information including one, more than one or all of: i) network event notifications, ii) network alarms, or iii) key performance information); receiving (655) cell related performance information (e.g., network event notifications, network alarms and/or key performance information) relating to one or more cells, said cell related performance information including information relating to at least a first cell (148); analyzing (670) the received cell related performance information to determine if one or more cells are to be removed from service (e.g., are to be unmanaged); and in response to determining (671) that one or more cells is to be removed from service, automatically sending (674) (e.g., to operations support system (OSS) 108) a message (e.g., unmanage message) (678) to initiate removal from service (e.g., un-management) of the one or more cells, said message (678) including a cell list listing cells to be removed from service (unmanaged), said cell list including at least the first cell.

Method Embodiment 2. The method of Method Embodiment 1, wherein automatically sending (674) the message (e.g., unmanage message) (678) to initiate removal from service of one or more cells includes sending an unmanage cells list to an operations support system (108) responsible for cell management in a first wireless network.

Method Embodiment 3. The method of Method Embodiment 2, further comprising: providing (682) to the OSS a KPI reporting modification list indicating unmanaged cells for which KPI information should no longer be reported to other entities.

Method Embodiment 4. The method of Method Embodiment 1, wherein analyzing (670) the received cell related performance information to determine if one or more cells are to remove from service includes analyzing (700) cell information corresponding to an individual cell to determine if the individual cell should be removed from service.

Method Embodiment 5. The method of Method Embodiment 4, wherein the individual cell is the first cell; and wherein analyzing (700) the received cell related performance information corresponding to an individual cell includes checking (704) events, notifications or both events and notifications to determine if the first cell is failing to provide service to user devices.

Method Embodiment 5A. The method of Method Embodiment 5, wherein checking (704) events, notifications or both events and notifications to determine if the first cell is failing to provide service to user devices includes checking (706) for reported hardware or software faults that render the first cell unable to provide service to user devices.

Method Embodiment 5B. The method of Method Embodiment 5, wherein checking (704) events, notifications or both events and notifications to determine if the first cell is failing to provide service to user devices includes checking (708) for a failure of the cell to provide data service to users (e.g., even when the cell continues to support control plane functionality and a UE remains attached to the first cell from a control perspective).

Method Embodiment 6. The method of Method Embodiment 4, wherein analyzing (700) cell information corresponding to an individual cell to determine if the individual cell should be removed from service includes comparing (730 or 732) a performance indicator value (KPI or Cell reset rate) to a cell management removal threshold (e.g., cell removal, threshold).

Method Embodiment 7. The method of Method Embodiment 6, wherein comparing (730) a performance indicator value (KPI or Cell reset rate) to a cell management removal threshold includes comparing a key performance indicator value corresponding to a measure of data throughput (e.g., average data throughput per user device in cell) to a corresponding cell removal threshold (e.g., average data throughput per user device threshold below which the cell should be removed from service).

Method Embodiment 7A. The method of Method Embodiment 7, wherein comparing (730) a performance indicator value (KPI or Cell reset rate) to a cell management removal threshold includes using a threshold which is more likely to result in removal of the individual cell from service when the individual cell is positioned between other cells in the network than when the individual cell is located at the edge of the network.

Method Embodiment 7B. The method of Method Embodiment 7, wherein comparing (730) a performance indicator value (KPI or Cell reset rate) to a cell management removal threshold includes using a cell removal threshold which is more likely to result in removal of the individual cell from service when the individual cell is a cell in which user devices are expected to remain a first short time than when the individual cell is a cell in which user devices are expected to remain a second longer time.

Method Embodiment 8. The method of Method Embodiment 6, wherein comparing (732) a performance indicator value (Cell reset rate per a predetermined amount of time) to a cell management removal threshold includes comparing a cell reset rate indicator value to a cell reset rate removal threshold (e.g., a threshold above which a cell will be selected to be removed from service because of an unacceptable number of resets per the predetermined amount of time).

Method Embodiment 9. The method of Method Embodiment 4, wherein analyzing (700) cell information corresponding to an individual cell to determine if the individual cell should be removed from service includes checking (736) to determine if alternative coverage is available before determining a cell is to be removed from service.

Method Embodiment 9A. The method of Method Embodiment 9, further comprising: in response to determining that alternative coverage is not available (N output of step 736) making a decision (738) to remove the individual cell from service.

Method Embodiment 9B. The method of Method Embodiment 9, further comprising: in response to determining that alternative coverage is available (Y output of step 736) making a decision (738) to remove the individual cell from service.

Method Embodiment 9C. The method of Method Embodiment 1, further comprising: in response to determining (671) that one or more cells are to be removed from service, generating (672) a list of cells to be unmanaged.

Method Embodiment 9C1. The method of Method Embodiment 9C, further comprising: generating (673) an unmanage message (676), said unmanage message including the list of cells to be unmanaged (removed from service).

Method Embodiment 10. The method of Method Embodiment 2, further comprising: in response to determining (6721) that multiple cells are to be removed from service, prioritizing (6722) cells for repair (e.g., where the prioritization is based on one, more than one, or all of: i) the amount of data traffic being supported by the cell (e.g., with a cell providing more offload (e.g., communication) of data being prioritized over another cell being removed from service providing less offload (communication) of data; ii) location of cell within the network (e.g., prioritize cells in center of network for repair over cells at edge of network to avoid handoffs to alternative provider when a UE is can likely be handed off to another cell in the network in the future than when at the cell edge where the UE is likely to move out of the network coverage in the near future).

Method Embodiment 10A. The method of Method Embodiment 10, further comprising: including (6731) the repair priority of cells to be removed from service in the unmanage message (676) including the list of cells to be unmanaged that is communicated to the OSS (e.g., in step 674).

Method Embodiment 10A1. The method of Method Embodiment 9, further comprising: in response to determining that alternative coverage is available, checking (in optional step 737) if the alternative coverage (e.g., macro base station coverage which covers the area of the individual cell being considered for removal from service) is estimated (e.g., predicted based on available information such a cell loading, transmit power and/or other factors) to provide better service to user devices than the individual cell (note that the check of whether the alternative service will provide better coverage than the service being provided by the individual cell being considered for removal is optional and not performed in all embodiments and that in cases where it is not performed a decision would be made to remove the cell from service due to the outcome of the cell removal threshold check or checks made in step 728).

Method Embodiment 10AA. The method of Method Embodiment 10A, further comprising: in response to determining that alternative coverage is not expected to provide better service to user devices (N output of step 737) making a decision (734) to keep the individual cell in service.

Method Embodiment 10B. The method of Method Embodiment 10A, further comprising: in response to determining that alternative coverage is expected to provide better service to user devices (Y output of step 737) making a decision (738) to remove the individual cell from service.

Method Embodiment 10C. The method of Method Embodiment 1, wherein the automatic network management entity performs management for cells in a first mobile network operator (MNO) network, said management including evaluation of cells with regard to the quality of service being provided to subscribers and selectively removing cells from service based on the evaluation.

Method Embodiment 10C1. The method of Method Embodiment 10C, wherein the first MNO network is a CBRS network (e.g., Charter CBRS network).

Method Embodiment 10C2. The method of Method Embodiment 10C1, wherein the cells in the first MNO network correspond to femto cell base stations (e.g., femto cell CBSDs).

Method Embodiment 11a. The method of Method Embodiment 10C, wherein said first MNO network is part of a Hybrid MNO (HMNO) network, said HMNO network including a MVNO network in addition to the first MNO network.

Method Embodiment 11aa. The method of Method Embodiment 11a, wherein said MVNO network uses physical resources (e.g., large cell base stations) owned by a different MNO (e.g., Verizon).

Method Embodiment 11aaa. The method of Method Embodiment 11a, wherein the first MNO network uses a higher frequency band than the frequency band of the MVNO partner network.

Method Embodiment 11B. The method of Method Embodiment 11aa, wherein management for cells of the first MNO performed by the automatic network management entity further includes bringing (824) unmanaged cells back to a managed state (e.g., send a message to OSS to initiate bringing a cell (included in a cell list generated in step 822) to a managed state).

Method Embodiment 11C. The method of Method Embodiment 11aa, wherein management for cells of the first MNO performed by the automatic network management entity further includes bringing (824) a replacement cell to a managed state, said replacement cell replaced an unmanaged cell (e.g., send a message to OSS to initiate bringing a cell (included in a cell list generated in step 822) to a managed state).

Method Embodiment 11D. The method of Method Embodiment 11aa, wherein the automatic network management entity takes into consideration alternative available coverage which can be provided by a MVNO network that is available to the subscribers.

Method Embodiment 11E. The method of Method Embodiment 11D, wherein the cells (e.g., Charter HMNO CBRS femto cells) being managed in the first MNO (e.g., Charter) network are smaller than the cells (large cells) available by the MVNO network (e.g., using a partner MNO, e.g. Verizon, network physical resources).

Numbered List of Exemplary Apparatus Embodiments

Apparatus Embodiment 1. An automatic network management entity (102) comprising: memory (910) including at least one cell performance removal threshold; and a processor (902), the processor being configured to control the automatic management entity to: subscribe the automatic network management entity (632) to an operations support system (OSS) (108) to receive cell information (e.g., events, alarms and/or KPI information) (e.g., subscribe in step 632 to receive network information including one, more than one or all of: i) network event notifications, ii) network alarms, or iii) key performance information); receive (655) cell related performance information (e.g., network event notifications, network alarms and/or key performance information) relating to one or more cells, said cell related performance information including information relating to at least a first cell (148); analyze (670) the received cell related performance information to determine if one or more cells are to be removed from service (e.g., unmanaged); and automatically send (674), in response to determining (671) that one or more cells is to be removed from service, (e.g., to operations support system (OSS) 108) a message (e.g., unmanage message) (678) to initiate removal from service (e.g., un-management) of the one or more cells, said message (678) including a cell list of listing cells to be removed from service (unmanaged), said cell list including at least the first cell.

Apparatus Embodiment 2. The automatic network management entity (102) of Apparatus Embodiment 1, wherein the processor (902) is configured to control the automatic management entity to: send an unmanage cells list to an operations support system (108) responsible for cell management in a first wireless network, as part of being configured to control the automatic management entity to automatically sending (674) the message (e.g., unmanage message) (678) to initiate removal from service of one or more cells.

Apparatus Embodiment 3. The automatic network management entity (102) of Apparatus Embodiment 2, wherein said processor is further configured to control the automatic network management entity to: provide (682) to the OSS a KPI reporting modification list indicating unmanaged cells for which KPI information should no longer be reported to other entities.

Apparatus Embodiment 4. The automatic network management entity (102) of Apparatus Embodiment 1, wherein said processor is configured to: analyze (700) cell information corresponding to an individual cell to determine if the individual cell should be removed from service, as part of being configured to analyze (670) the received cell related performance information to determine if one or more cells are to be removed from service.

Apparatus Embodiment 5. The automatic network management entity (102) of Apparatus Embodiment 4, wherein the individual cell is the first cell; and wherein said processor is configured to: check (704) events, notifications or both events and notifications to determine if the first cell is failing to provide service to user devices, as part of being configured to analyze (700) the received cell related performance information corresponding to an individual cell.

Apparatus Embodiment 5A. The automatic network management entity (102) of Apparatus Embodiment 5, wherein said processor is configured to: check (706) for reported hardware or software faults that render the first cell unable to provide service to user devices, as part of being configured to check (704) events, notifications or both events and notifications to determine if the first cell is failing to provide service to user devices.

Apparatus Embodiment 5B. The automatic network management entity (102) of Apparatus Embodiment 5, wherein said processor is configured to: check (708) for a failure of the cell to provide data service to users (e.g., even when the cell continues to support control plane functionality and a UE remains attached to the first cell from a control perspective), as part of being configured to check (704) events, notifications or both events and notifications to determine if the first cell is failing to provide service to user devices.

Apparatus Embodiment 6. The automatic network management entity (102) of Apparatus Embodiment 4, wherein said processor is configured to compare (730 or 732) a performance indicator value (KPI or Cell reset rate) to a cell management removal threshold (e.g., cell removal, threshold), as part of being configured to analyze (700) cell information corresponding to an individual cell to determine if the individual cell should be removed from service includes Apparatus Embodiment 7. The automatic network management entity (102) of Apparatus Embodiment 6, wherein said processor is configured to: compare a key performance indicator value corresponding to a measure of data throughput (e.g., average data throughput per user device in cell) to a corresponding cell removal threshold (e.g., average data throughput per user device threshold below which the cell should be removed from service), as part of being configured to compare (730) a performance indicator value (KPI or Cell reset rate) to a cell management removal threshold.

Apparatus Embodiment 7A. The automatic network management entity (102) of Apparatus Embodiment 7, wherein said processor is configured to: use a threshold which is more likely to result in removal of the individual cell from service when the individual cell is positioned between other cells in the network than when the individual cell is located at the edge of the network, as part of being configured to compare (730) a performance indicator value (KPI or Cell reset rate) to a cell management removal threshold.

Apparatus Embodiment 7B. The automatic network management entity (102) of Apparatus Embodiment 7, wherein said processor is configured to: use a cell removal threshold which is more likely to result in removal of the individual cell from service when the individual cell is a cell in which user devices are expected to remain a first short time than when the individual cell is a cell in which user devices are expected to remain a second longer time, as part of being configured to compare (730) a performance indicator value (KPI or Cell reset rate) to a cell management removal threshold.

Apparatus Embodiment 8. The automatic network management entity (102) of Apparatus Embodiment 6, wherein said processor is configured to compare a cell reset rate indicator value to a cell reset rate removal threshold (e.g., a threshold above which a cell will be selected to be removed from service because of an unacceptable number of resets per the predetermined amount of time), as part of being configured to compare (732) a performance indicator value (Cell reset rate per a predetermined amount of time) to a cell management removal threshold.

Apparatus Embodiment 9. The automatic network management entity (102) of Apparatus Embodiment 4, wherein said processor is configured to: check (736) to determine if alternative coverage is available before determining a cell is to be removed from service, as part of being configured to analyze (700) cell information corresponding to an individual cell to determine if the individual cell should be removed from service.

Apparatus Embodiment 9A. The automatic network management entity (102) of Apparatus Embodiment 9, wherein said processor is further configured to: make a decision (738) to remove the individual cell from service, in response to determining that alternative coverage is not available (N output of step 736).

Apparatus Embodiment 9B. The automatic network management entity (102) of Apparatus Embodiment 9, wherein said processor is further configured to: make a decision (738) to remove the individual cell from service, in response to determining that alternative coverage is available (Y output of step 736).

Apparatus Embodiment 9C. The automatic network management entity (102) of Apparatus Embodiment 1, wherein said processor is further configured to: generate (672) a list of cells to be unmanaged, in response to determining (671) that one or more cells are to be removed from service.

Apparatus Embodiment 9C1. The automatic network management entity (102) of Apparatus Embodiment 9C, wherein said processor is further configured to: generate (673) an unmanage message (676), said unmanage message including the list of cells to be unmanaged (removed from service).

Apparatus Embodiment 10. The automatic network management entity (102) of Apparatus Embodiment 2, wherein said processor is further configured to: in response to determining (6721) that multiple cells are to be removed from service, prioritize (6722) cells for repair (e.g., where the prioritization is based on one, more than one, or all of: i) the amount of data traffic being supported by the cell (e.g., with a cell providing more offload (e.g., communication) of data being prioritized over another cell being removed from service providing less offload (communication) of data; ii) location of cell within the network (e.g., prioritize cells in center of network for repair over cells at edge of network to avoid handoffs to alternative provider when a UE is can likely be handed off to another cell in the network in the future than when at the cell edge where the UE is likely to move out of the network coverage in the near future).

Apparatus Embodiment 10A. The automatic network management entity (102) of Apparatus Embodiment 10, wherein said processor is further configured to: include (6731) the repair priority of cells to be removed from service in the unmanage message (676) including the list of cells to be unmanaged that is communicated to the OSS (e.g., in step 674).

Apparatus Embodiment 10A1. The automatic network management entity (102) of Apparatus Embodiment 9, wherein said processor is further configured to: in response to determining that alternative coverage is available, check (in optional step 737) if the alternative coverage (e.g., macro base station coverage which covers the area of the individual cell being considered for removal from service) is estimated (e.g., predicted based on available information such a cell loading, transmit power and/or other factors) to provide better service to user devices than the individual cell (note that the check of whether the alternative service will provide better coverage than the service being provided by the individual cell being considered for removal is optional and not performed in all embodiments and that in cases where it is not performed a decision would be made to remove the cell from service due to the outcome of the cell removal threshold check or checks made in step 728).

Apparatus Embodiment 10AA. The automatic network management entity (102) of Apparatus Embodiment 10A, wherein said processor is further configured to: in response to determining that alternative coverage is not expected to provide better service to user devices (N output of step 737), make a decision (734) to keep the individual cell in service.

Apparatus Embodiment 10B. The automatic network management entity (102) of Apparatus Embodiment 10A, wherein said processor is further configured to: in response to determining that alternative coverage is expected to provide better service to user devices (Y output of step 737), make a decision (738) to remove the individual cell from service.

Apparatus Embodiment 10C. The automatic network management entity (102) of Apparatus Embodiment 1, wherein said processor is configured to control the automatic network management entity to perform management for cells in a first mobile network operator (MNO) network, said management including evaluation of cells with regard to the quality of service being provided to subscribers and selectively removing cells from service based on the evaluation.

Apparatus Embodiment 10C1. The automatic network management entity (102) of Apparatus Embodiment 10C, wherein the first MNO network is a CBRS network (e.g., Charter CBRS network).

Apparatus Embodiment 10C2. The automatic network management entity (102) of Apparatus Embodiment 10C1, wherein the cells in the first MNO network correspond to femto cell base stations (e.g., femto cell CBSDs).

Apparatus Embodiment 11a. The automatic network management entity (102) of Apparatus Embodiment 10C, wherein said first MNO network is part of a Hybrid MNO (HMNO) network, said HMNO network including a MVNO network in addition to the first MNO network.

Apparatus Embodiment 11aa. The automatic network management entity (102) of Apparatus Embodiment 11a, wherein said MVNO network uses physical resources (e.g., large cell base stations) owned by a different MNO (e.g., Verizon).

Apparatus Embodiment 11aaa. The automatic network management entity (102) of Apparatus Embodiment 11a, wherein the first MNO network uses a higher frequency band than the frequency band of the MVNO partner network.

Apparatus Embodiment 11B. The automatic network management entity (102) of Apparatus Embodiment 11aa, wherein said processor is configured to: control the automatic management entity to bring (824) unmanaged cells back to a managed state, as part of being configured to perform management for cells of the first MNO (e.g., send message to OSS to initiate bringing a cell to managed state).

Apparatus Embodiment 11C. The automatic network management entity (102) of Apparatus Embodiment 11aa, wherein said processor is configured to: control the automatic management entity to bring (824) a replacement cell to a managed state, said replacement cell replacing an unmanaged cell, as part of being configured to perform management for cells of the first MNO (send message to OSS to initiate brining a cell to a managed state).

Apparatus Embodiment 11D. The automatic network management entity (102) of Apparatus Embodiment 11aa, wherein the automatic network management entity takes into consideration alternative available coverage which can be provided by a MVNO network that is available to the subscribers.

Apparatus Embodiment 11E. The automatic network management entity (102) of Apparatus Embodiment 11D, wherein the cells being managed in the first MNO network are smaller than the cells available by the MVNO network.

Numbered List of Exemplary Non-Transitory Computer Readable Medium Embodiments

Non-Transitory Computer Readable Medium Embodiment 1. A non-transitory computer readable medium (910) including machine readable instructions, which when executed by a processor (902) of an automatic management entity (102) cause the automatic management entity (102) to implement the steps of: subscribing (632) to an operations support system (OSS) (108) to receive cell information (e.g., events, alarms and/or KPI information) (e.g., subscribe in step 632 to receive network information including one, more than one or all of: i) network event notifications, ii) network alarms, or iii) key performance information); receiving (655) cell related performance information (e.g., network event notifications, network alarms and/or key performance information) relating to one or more cells, said cell related performance information including information relating to at least a first cell (148); analyzing (670) the received cell related performance information to determine if one or more cells are to be removed from service (e.g., are to be unmanaged); and in response to determining (671) that one or more cells is to be removed from service, automatically sending (674) (e.g., to operations support system (OSS) 108) a message (e.g., unmanage message) (678) to initiate removal from service (e.g., un-management) of the one or more cells, said message (678) including a cell list listing cells to be removed from service (unmanaged), said cell list including at least the first cell.

The techniques of various embodiments may be implemented using software, hardware and/or a combination of software and hardware. Various embodiments are directed to apparatus, e.g., an automatic management entity, OSS device, propagation generator, user equipment (UE) devices supporting NR-U and/or SL-U, base stations, e.g. gNBs supporting NR-U and/or SL-U, communications devices such as gateways, e.g., RGs, 5G-RGs, routers, e.g., home routers, W-AGFs, core network devices (e.g., AMF devices, PCF devices, SMF devices, UPF devices, UDM devices, UDR devices etc.), access network devices (e.g., base stations, e.g., HgNB femtocell CBRS base stations, gNBs, WiFi access nodes, e.g., WiFi APs, cable network access devices), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating communications devices such as an automatic management entity, an OSS, a propagation generator, user equipment (UE) devices supporting NR-U and/or SL-U, base stations, e.g. gNBs supporting NR-U and/or SL-U, gateways, e.g. RGs, e.g., 5G-RG devices, routers such as home routers, W-AGF devices, end user devices such as end user devices supporting both cellular and WiFi communications and end user devices supporting WiFi communications, user equipment (UE) devices, core network devices (e.g., AMF devices, PCF devices, SMF devices, UPF devices, UDM devices, UDR devices, etc.), wireless devices, mobile devices, smartphones, subscriber devices, desktop computers, printers, IPTV, laptops, tablets, network edge devices, base stations, e.g., HgNB femtocell CBRS base stations, Access Points, e.g., WiFi APs, wireless routers, switches, WLAN controllers, orchestration servers, orchestrators, Gateways, AAA servers, servers, nodes and/or elements. Various embodiments are also directed to a machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., an automatic management entity, an OSS, a propagation generator, communications devices such as user equipment (UE) devices supporting NR-U and/or SL-U, base stations, e.g. gNBs supporting NR-U and/or SL-U, gateways, e.g. residential gateways (RGs), e.g., 5G-RG devices, routers, e.g., home routers, W-AGF devices, end user devices, e.g., end user devices supporting both cellular and WiFi communications and end user devices supporting WiFi communications, user equipment (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, base stations, e.g., HgNB femtocell CBRS base stations, Access Points, e.g., WiFi APs, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, automatic management entities, OSS devices, UEs, base stations, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., an automatic management entity, an OSS device, communications devices such as user equipment (UE) devices supporting NR-U and/or SL-U, base stations, e.g. gNBs supporting NR-U and/or SL-U, gateways, e.g., residential gateways (RGs), e.g., 5G-RG devices, routers, e.g., home routers, W-AGF devices, 3GPP access network devices, end user devices, e.g., end user devices supporting both cellular and WiFi communications, user (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, base stations, e.g. HgNB CBRS femetocell base stations, Access Points, e.g., WiFi APs, wireless routers, switches, WLAN controllers, orchestration servers, orchestrators, Gateways, AAA servers, servers, nodes and/or elements, are configured to perform the steps of the methods described as being performed by the automatic management entity, the OSS device, the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements.

The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., an automatic management entity, an OSS device, communications devices such as a user equipment (UE) device supporting NR-U and/or SL-U, a base station, e.g. gNB supporting NR-U and/or SL-U, gateways, e.g., residential gateways (RGs), e.g., 5G-RG devices, W-AGF devices, end user devices, e.g., end user devices supporting both cellular and WiFi communications and end user devices supporting WiFi communications, a user equipment (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, base stations, e.g. HgNB CBRS femtocell base stations, Access Points, e.g., WiFi APs, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., a user equipment (UE) device supporting NR-U and/or SL-U, a base station, e.g. gNB supporting NR-U and/or SL-U, a gateway such as a residential gateway (RG), e.g., a 5G-RG devices, a w-AGF device, an end user device, e.g., an end user device supporting both cellular and WiFi communications or an end user device supporting WiFi communications, a 3GPP access network device, user equipment (UE) device, core network device (e.g., PCF device, AMF device, SMF device, UPF device, EDM device, UDR device, etc.), wireless device, mobile device, smartphone, subscriber device, desktop computer, printer, IPTV, laptop, tablet, network edge device, Access Point, e.g., a WiFi AP, a wireless router, switch, WLAN controller, orchestration server, orchestrator, Gateway, AAA server, server, node and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., an automatic management entity, an OSS device, a communications device such as a user equipment (UE) device supporting NR-U and/or SL-U, a base station, e.g. a gNB supporting NR-U and/or SL-U, a gateway, e.g., a residential gateway (RG), e.g., 5G-RG devices, W-AGF devices, 3GPP access network devices, end user devices, e.g., end user device supporting cellular and WiFi communications or an end user device supporting WiFi communications, user (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, base stations, e.g. a HgNB CBRS femtocell base station, Access Points, e.g., WiFi APs, wireless routers, switches, WLAN controllers, orchestration servers, orchestrators, Gateways, AAA servers, servers, nodes and/or elements. The code may be in the form of machine, e.g., computer, executable Instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an automatic management entity, an OSS device, a communications device such as a user equipment (UE) device supporting NR-U and/or SL-U, a base station, e.g. gNB supporting NR-U and/or SL-U, a gateway such as a residential gateway (RG), e.g. a 5G-RG device, a router, e.g., a home router, a W-AGF device, a 3GPP access network device, e.g., a gNB, an end user device such as an end user device supporting both cellular and WiFi communications or an end user device supporting WiFi communications, a user equipment (UE) device, core network device (e.g., PCF device, AMF device, SMF device, UPF device, UDM device, UDR device, etc.), wireless device, mobile device, smartphone, subscriber device, desktop computer, printer, IPTV, laptop, tablets, network edge device, a base station, e.g., a HgNB CBRS femtocell base station, and Access Point, e.g., a WiFi AP, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating an automatic network management entity, the method comprising:

subscribing to an operations support system (OSS) to receive cell information;

receiving cell related performance information relating to one or more cells, said cell related performance information including information relating to at least a first cell;

analyzing the received cell related performance information to determine if one or more cells are to be removed from service; and in response to determining that one or more cells is to be removed from service, automatically sending a message to initiate removal from service of the one or more cells, said message including a cell list listing cells to be removed from service, said cell list including at least the first cell.

2. The method of claim 1, wherein automatically sending the message to initiate removal from service of one or more cells includes sending an unmanage cells list to an operations support system responsible for cell management in a first wireless network.

3. The method of claim 2, further comprising:

providing to the OSS a KPI reporting modification list indicating unmanaged cells for which KPI information should no longer be reported to other entities.

4. The method of claim 1, wherein analyzing the received cell related performance information to determine if one or more cells are to remove from service includes analyzing cell information corresponding to an individual cell to determine if the individual cell should be removed from service.

5. The method of claim 4, wherein the individual cell is the first cell; and wherein analyzing the received cell related performance information corresponding to an individual cell includes checking events, notifications or both events and notifications to determine if the first cell is failing to provide service to user devices.

6. The method of claim 4, wherein analyzing cell information corresponding to an individual cell to determine if the individual cell should be removed from service includes comparing a performance indicator value to a cell management removal threshold.

7. The method of claim 6, wherein comparing a performance indicator value to a cell management removal threshold includes comparing a key performance indicator value corresponding to a measure of data throughput to a corresponding cell removal threshold.

8. The method of claim 6, wherein comparing a performance indicator value to a cell management removal threshold includes comparing a cell reset rate indicator value to a cell reset rate removal threshold.

9. The method of claim 4, wherein analyzing cell information corresponding to an individual cell to determine if the individual cell should be removed from service includes checking to determine if alternative coverage is available before determining a cell is to be removed from service.

10. The method of claim 2, further comprising:

in response to determining that multiple cells are to be removed from service, prioritizing cells for repair.

11. An automatic network management entity comprising:

memory including at least one cell performance removal threshold; and a processor, the processor being configured to control the automatic network management entity to:

subscribe the automatic network management entity to an operations support system (OSS) to receive cell information;

receive cell related performance information relating to one or more cells, said cell related performance information including information relating to at least a first cell;

analyze the received cell related performance information to determine if one or more cells are to be removed from service; and automatically send, in response to determining that one or more cells is to be removed from service, a message to initiate removal from service of the one or more cells, said message including a cell list of listing cells to be removed from service, said cell list including at least the first cell.

12. The automatic network management entity of claim 11, wherein the processor is configured to control the automatic network management entity to:

send an unmanage cells list to an operations support system responsible for cell management in a first wireless network, as part of being configured to control the automatic network management entity to automatically send the message to initiate removal from service of one or more cells.

13. The automatic network management entity of claim 12, wherein said processor is further configured to control the automatic network management entity to:

provide to the OSS a KPI reporting modification list indicating unmanaged cells for which KPI information should no longer be reported to other entities.

14. The automatic network management entity of claim 11, wherein said processor is configured to:

analyze cell information corresponding to an individual cell to determine if the individual cell should be removed from service, as part of being configured to analyze the received cell related performance information to determine if one or more cells are to be removed from service.

15. The automatic network management entity of claim 14, wherein the individual cell is the first cell; and wherein said processor is configured to: check events, notifications or both events and notifications to determine if the first cell is failing to provide service to user devices, as part of being configured to analyze the received cell related performance information corresponding to an individual cell.

16. The automatic network management entity of claim 14, wherein said processor is configured to compare a performance indicator value to a cell management removal threshold, as part of being configured to analyze cell information corresponding to an individual cell to determine if the individual cell should be removed from service.

17. The automatic network management entity of claim 16, wherein said processor is configured to: compare a key performance indicator value corresponding to a measure of data throughput to a corresponding cell removal threshold, as part of being configured to compare a performance indicator value to a cell management removal threshold.

18. The automatic network management entity of claim 16, wherein said processor is configured to compare a cell reset rate indicator value to a cell reset rate removal threshold, as part of being configured to compare a performance indicator value to a cell management removal threshold.

19. The automatic network management entity of claim 14, wherein said processor is configured to: check to determine if alternative coverage is available before determining a cell is to be removed from service, as part of being configured to analyze cell information corresponding to an individual cell to determine if the individual cell should be removed from service.

20. A non-transitory computer readable medium including machine readable instructions, which when executed by a processor of an automatic management entity cause the automatic management entity to implement the steps of:

subscribing to an operations support system (OSS) to receive cell information;

receiving cell related performance information relating to one or more cells, said cell related performance information including information relating to at least a first cell;

analyzing the received cell related performance information to determine if one or more cells are to be removed from service; and in response to determining that one or more cells is to be removed from service, automatically sending a message to initiate removal from service of the one or more cells, said message including a cell list listing cells to be removed from service, said cell list including at least the first cell.

* * * * *